340-870.11 SR
OR 2,942,244
X7048T X7006C X7025C X7002B
SEARCH ROOM

June 21, 1960 W. M. LARSON 2,942,244

DIGITAL TYPE IMPULSE-STORAGE TELEMETERING SYSTEM

Filed Aug. 23, 1956 3 Sheets-Sheet 1

INVENTOR.
WALTER M LARSON
BY Ralph L. Wugger
ATTORNEY

June 21, 1960 W. M. LARSON 2,942,244

DIGITAL TYPE IMPULSE-STORAGE TELEMETERING SYSTEM

Filed Aug. 23, 1956 3 Sheets-Sheet 2

INVENTOR.
WALTER M. LARSON
BY Ralph L. Klugger
ATTORNEY

June 21, 1960 W. M. LARSON 2,942,244

DIGITAL TYPE IMPULSE-STORAGE TELEMETERING SYSTEM

Filed Aug. 23, 1956 3 Sheets-Sheet 3

INVENTOR.
WALTER M. LARSON
BY Ralph L. Klugger
ATTORNEY

United States Patent Office 2,942,244

Patented June 21, 1960

2,942,244

DIGITAL TYPE IMPULSE-STORAGE TELEMETERING SYSTEM

Walter M. Larson, Minneapolis, Minn., assignor to Control Corporation, Minneapolis, Minn., a corporation of Minnesota Filed Aug. 23, 1956, Ser. No. 605,749

38 Claims. (Cl. 340—182)

This invention relates generally to the art of telemetering, and pertains more particularly to a telemetering system of the impulse type which is capable of storing, transmitting and receiving digital information.

In general, a system in accordance with the instant invention includes a storage unit or section comprised of a plurality of stepping switches. The particular contact position for a particular order determines the magnitude of the stored information. A transmitter section is associated with the storage section and is responsible for forwarding a series of pulses to the receiver section located at a remote vantage point, the receiver also being comprised of a group of stepping switches.

For each order of information that is transmitted there is a modified pulse produced in the form of a long pulse which is of course distinguishable from the other pulses by reason of its length. This long pulse is employed to stop further registration at the receiver end. This is done by providing means for inactivating or disconnecting the stepping switch portion of the receiver associated with the order of information being transmitted. The long pulse and any succeeding short pulses arriving at the receiver end cannot cause further registration until the receiver is conditioned for the reception of additional information. Information is also transmitted to the receiver which is indicative of the storage location. After all the transmitted information has been received an automatic read-out ensues. When the next reading is called for there is an automatic resetting of the receiver. However, the reading can be manually cancelled at any time.

Several checking arrangements are incorporated into the system: Inasmuch as any order contains ten possible digital values, provision is made which assures that ten pulses representative of these possible values are received. Less than ten pulses received at the receiver will be interpreted as an incorrect reading and an automatic resetting of the receiver section will be initiated. Likewise, if more than ten pulses are received, the reading will be cancelled. Inasmuch as a long pulse is transmitted, its relataion in the series of pulses indicating the magnitude for a given order, provision is made for determining whether such a long pulse has arrived at the receiver. Hereagain, the reading at the receiver will be cancelled, if such is not the case. Still further, provision is made which guards against transfer of information to the higher orders during a read-out. No loss of information results; instead there is merely a postponement of the transfer.

One important object of the present invention is to provide a telemetering system that will be exceedingly reliable in its operation. In this regard, it is an aim of the invention to provide a telemetering system of the impulse variety that will be relatively maintenance free. For instance, it is contemplated that a system constructed in accordance with the teachings of my invention will be operable on relatively low voltages and with little current, thereby helping to prolong the electrical life of the equipment. Further, the proposed system is not vulnerable to shock, vibration and elevated temperatures, which factors heretofore have contributed to various degrees of system deterioration. Also, entering into the reliability of the system is the fact that the transmitter and receiver units need only be placed in operation when informational data is desired at the receiving end, provision for storage at the transmission end obviating the need for the continuous transmission and reception of information.

Another object of the invention is to provide a system of the foregoing character in which information may be asked for from the receiving end as many times as is desired without loss or impairment of any of the stored data.

A further object of the invention is to provide a telemetering system that will be highly accurate and stable. Regarding this object, it is planned that the system can be subjected to rather wide fluctuations in supply voltage without adverse effect on accuracy. Further, it is envisaged that the system be devoid of critically sensitive timing circuits that might, when out of adjustment, provide an incorrect reading. Also, it is an aim of the invention to avoid improper operation as a result of circuit interruptions or noise from stray inductive signals. More specifically, regarding this latter set of circumstances, it is within the purview of the invention to make the system self-checking as to accuracy. Still further, it is intended that the system be rendered incapable of providing an incorrect reading due to coincidence of a storage operation with a read-out operation that would otherwise produce conflicting results.

Yet another object of the invention is to permit a sharing of the transmission medium, whether it be a wired circuit or a radio circuit, with other services, this stemming from the fact that only a short transmission period is herein needed and which also may be selectively timed, if desired, so as not to interfere with the sending of other signals.

Still another object is to provide for remote station identification which is automatically presented to the central station in conjunction with the data pertaining to the particular measurand being transmitted.

Further, an additional feature of the invention resides in the versatility and flexibility of the devised system, for provision for the storage, transmission and reception of any preferred number of digital orders can be made with a minimum of effort and supplemental equipment. Hence, if the customer later finds that more digital information should be handled, the equipment may be readily expanded to suit his augmented needs.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
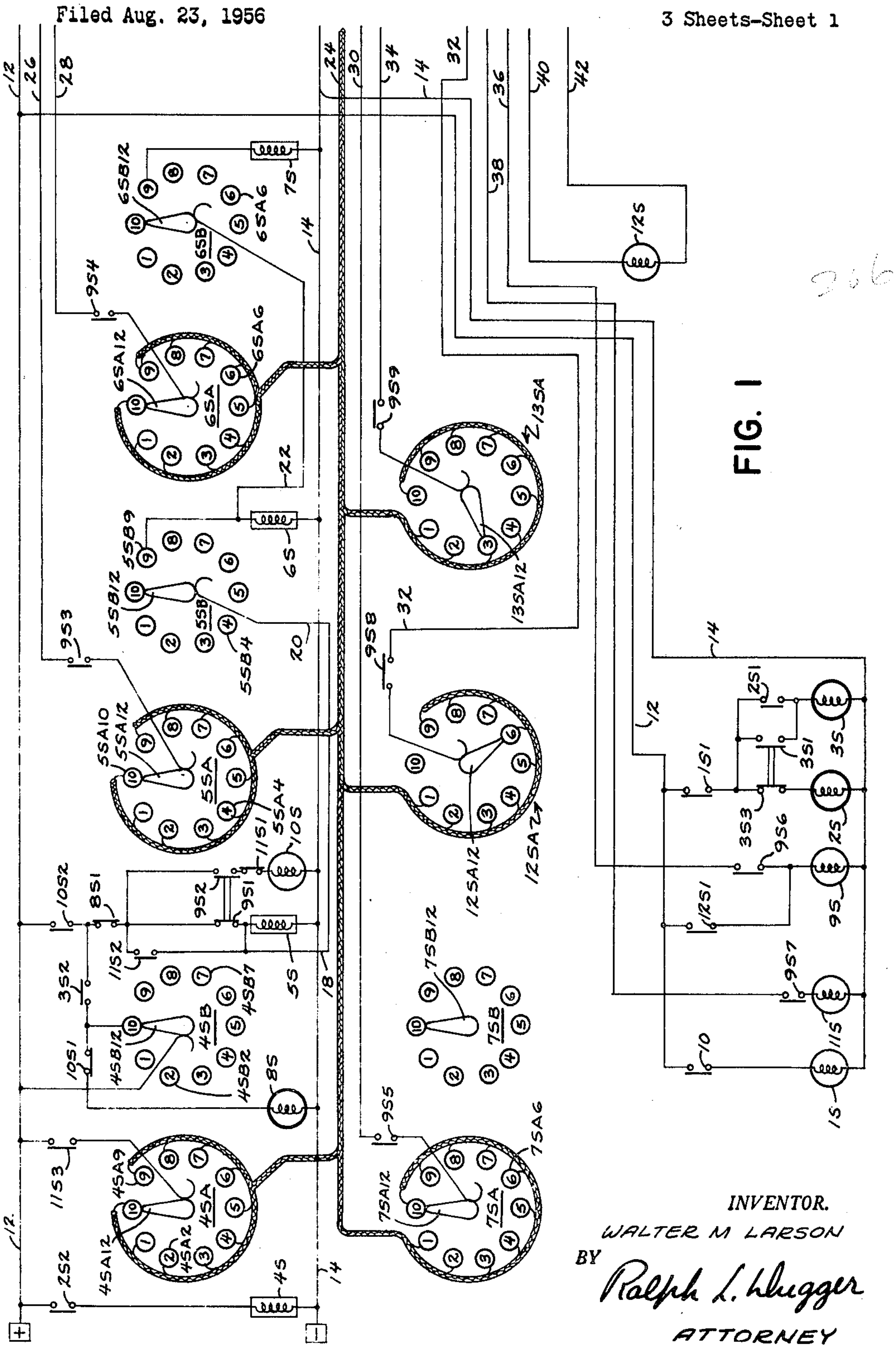
Figure 1 is a schematic representation of the storage unit portion of my telemetering system.

In order to facilitate the description of the overall telemetering system constituting the subject matter of the instant invention, the system will be divided into three principal units or sections: (1) storage, (2) transmitter and (3) receiver. As a further endeavor to aid in the understanding of the invention, it will become evident as the specific disclosure proceeds that there are a number of different relay coils which control one or more sets of relay contacts which, for purposes of clarification in the drawings, are shown at a point removed from the operating coil, and in order to physically orient simply and clearly each coil with its operated contacts, they will be hereinafter referred to by the same numerical prefix followed by a letter but with a different numerical suffix for each set of contacts actuated by that particular relay or stepping switch, as the case may be. For example, in the description of the storage unit the second relay to be referred to will be 2S and since it has two sets of contacts the first set will be termed 2S1 and the second 2S2. The letter "S" signifies that the relay is a part of the storage unit; the letters "T" and "R" will similarly mean that any relays or stepping switches bearing these letters will be components of the transmitter and receiver, respectively.

*Storage unit*

Referring now to Figure 1, the storage unit there schematically pictured is capable of storing four digit quantities, viz., "units," "tens," "hundreds" and "thousands." Additionally, it will also be made apparent as the description progresses that the storage unit is equipped with means for identifying itself, there being provision for including station numbers from "one" to "ninety-nine." Thus, where the storage unit is a part of a system of such storage units, it may be appropriately identified by number so that its informational data may be properly processed at the central station.

Although certainly not limited thereto, the present invention will find utility in the efficient and effective operation of power transmission and distribution lines. Therefore, for the sake of description we will assume that the registration of a kilowatt-hour meter located at some remote substation is to be stored and that its rotating spindle is equipped with a cam capable of causing closure of a set of primary contacts 10 each time that a kilowatt-hour is measured. It will be distinctly understood, though, that the measurand may be representative of other quantities, such as gas or liquid flow, shaft position, etc. Through the agency of a positive bus 12 and a negative bus 14 having a suitable potential impressed thereon (for example, a relatively low battery or rectifier voltage), the closing of the contacts 10 will energize a kilowatt-hour relay 1S, the purpose of which is to prevent the contacts 10 from being over-loaded. In the effectuation of this protection, the relay 1S is provided with a pair of normally open contacts 1S1, and each time the kilowatt-hour contacts 10 close, the relay 1S will pick up its contacts 1S1. Under the influence of the contacts 1S1 is a units operator relay 2S and a units pulse breaking relay 3S, the former having two pairs of normally open contacts 2S1 and 2S2 and the latter also having two pairs of normally open contacts 3S1 and 3S2 plus a pair of normally closed contacts 3S3. More will be said later on concerning the role played by the 3S2 contacts. However, it should be explained at this time that the 2S relay is a fast operate, slow release type, whereas the 3S relay is a slow operate, slow release one. Consequently, it can be seen that relay 2S will operate rapidly through the contacts 3S3 to close its contacts 2S1 and thereby energize relay 3S. Relay 3S will seal itself in through its contacts 3S1, but at the same time opening contacts 3S3 to the relay 2S.

In the meantime, though, the contacts 2S2, owing to their having been closed by reason of the energization of relay 2S, will have energized a solenoid 4S, the solenoid being a part of a stepping switch. Stepping switches of the type employed are now regarded as conventional and need not be described in detail other than to say that energization of each solenoid herein mentioned actuates or cocks a pawl which moves against a spring supplied bias. No contact movement takes place until de-energization of the solenoid, whereupon advancement or stepping is occasioned by the spring. Operated by the solenoid 4S are two switch levels or banks 4SA and 4SB, each having ten circumferentially arranged contacts wiped respectively by rotary contact arms 4SA12, 4SB12 which are mechanically coupled together for movement in unison.

Hence, when the solenoid 4S is energized the switch levels 4SA and 4SB become conditioned for an advancement from 4SA10 and 4SB10 to 4SA1 and 4SB1, respectively. Owing to the slow release feature incorporated into relay 2S, approximately 0.25 second in the present situation, this relay will drop out this period of time after the contacts 3S3 have opened, and concomitantly therewith the contacts 2S2 will open to de-energize the solenoid 4S, thereby permitting simultaneous spring advancement of the contact arms 4SA12, 4SB12 of the stepping switch 4SA—4SB to their next adjacent contacts 4SA1 and 4SB1, respectively. It is to be noted that the foregoing happens even though the relay 1S may remain operated by the kilowatt-hour contacts 10, as will frequently occur when the demand for power has dropped off. Therefore, by virtue of the relays 2S and 3S there can be no more than a one shot, pulse-type energization of the solenoid 4S for a single closure of the kilowatt-hour contacts 10. Stated somewhat differently, with the envisaged arrangement, even though the contacts 10 remain closed, there can be no successive stepping of the switch levels 4SA—4SB which would result in an erroneous storing of information. Since the stepping switch 4SA—4SB is advanced counterclockwise one contact point for each closure of the kilowatt-hour contacts 10, it will represent the "units" quantity being stored.

Additional stepping switch solenoids 5S, 6S and 7S serve to actuate switch levels 5SA—5SB, 6SA—6SB and 7SA—7SB, energization of these various solenoids causing storage of "tens," "hundreds" and "thousands" in that order. Considering first the storage of the "tens" order, it is to be observed that when the rotatable contact arm 4SB12 is in engagement with contact 4SB10, as it will be after the storage of ten units, a circuit is established from the positive bus 12 through contacts 3S2 (closed when 3S is energized) to normally closed contacts 8S1 belonging to a greater than units pulse breaking relay 8S which is a slow operate relay, that is, slower operating than solenoid 5S. From the contacts 8S1 the circuit may be traced through a pair of contacts 9S1 of a read-out relay labeled 9S to one side of the solenoid 5S and thence to the negative bus 14. By reason of this path the solenoid 5S is energized to trigger the pawl of the stepping switch levels 5SA—5SB.

There is a parallel path that the current also takes, this being from the contact 4SB10 through a set of normally closed contacts 10S1 belonging to a slow release pulse storing relay 10S on to the relay 8S. The purpose of the relay 8S, termed a pulse breaking relay in the preceding paragraph, is to break the circuit to the 5S solenoid after this solenoid has been momentarily energized (the momentary energization being ample to trigger the pawl for the unitized switch levels 5SA—5SB). In actual practice relay 8S is designed to pick up approximately 0.1 second after its energization, which incidentally is when the solenoid 5S is energized. Accordingly, this 0.1 second interval is utilized to assure operation of the solenoid 5S. Because contacts 10S1 do not open during this operational phase, the relay 8S stays energized as long as the rotatable contact arm 4SB12 remains on contact 4SB10.

One thing that should be remembered at this point is that the 5SA—5SB stepping switch is advanced from its tenth or zero contact, that is contacts 5SA10 and 5SB10, to its first contact, that is contacts 5SA1 and 5SB1, by the same pulse advancing the 4SA—4SB switch from its contacts 4SA9 and 4SB9 to contacts 4SA10 and 4SB10. It should also be borne in mind that this occurs in a progressive fashion each time that the arms 4SA12 and 4SB12 complete one revolution or passage over all ten of their contacts. Thus there is a carry over from the "units" to the "tens." Somewhat similarly, there is provided a carry over from the "tens" to the "hundreds," for when the rotatable arm 5SB12 reaches its ninth contact 5SB9 (not 5SB10) a circuit is established from a junction intermediate the contacts 9S1 and the solenoid 5S over a conductor 16 a conductor 18 and a conductor 20 leading to said switch arm 5SB12. This electrical path is of course instrumental in pulsing the solenoid 6S, but the advancement is actually postponed until de-energization of solenoid 6S which occurs when the arm 5SB12 leaves its contact 5SB9 to go to the next succeeding contact 5SB10, as it will do upon the soon to happen opening of the contacts 8S1 through the delayed energization of the relay 8S, these contacts 8S1 being normally closed.

By the same token, after the arm 6SB12 has reached its associated contact 6SB9, a circuit is made via contact 5SB9 over a conductor 22 to this rotary arm 6SB12 and then to the solenoid 7S, thereby energizing this solenoid to trigger the spring loaded ratchet of the stepping switch 7SA—7SB. Of course there can be no transfer or carry over to the "thousands" switch levels 7SA—7SB unless the arm 5SB12 belonging to the "tens" switch levels 5SA—5SB is positioned on its ninth contact 5SB9 irrespective of the exact contact position of the arm 6SB12. Consequently, it is believed readily apparent that the transfer through the storage unit of Figure 1 is a progressive or cumulative one.

Reference has already been made to the read-out relay 9S and its contacts 9S1. Actually, this relay carries a relatively large number of contacts, a number sufficient to warrant in practice the use of two such relays connected in parallel, although only one relay 9S is depicted in the drawing. Inspection of Figure 1 will therefore reveal the additional inclusion of the following normally open contacts: 9S2, 9S3, 9S4, 9S5, 9S6, 9S7, 9S8 and 9S9. The contacts 9S2 are in series with a pair of normally closed contacts 11S1 on a units transmitting relay 11S. It might be mentioned at this stage of the description that the relay 11S also controls normally open contacts 11S2 and 11S3, the contacts 11S2 being in shunt with contacts 9S1 and the contacts 11S3 connecting the positive bus 12 to the rotatable arm 4SA12 of the switch level 4SA. By reason of contacts 10S2, which are normally open, on the relay 10S, an electrical path can be established from the positive bus 12 to the contacts 11S2 even though contacts 3S2 are open. This will become clearer hereinafter. The contacts 9S3, 9S4 and 9S5 lead to the transmitter unit, yet to be described, so their specific role may better be reserved for later discussion, although it is now apparent that they are connected in circuit with the rotatable arms 5SA12, 6SA12 and 7SA12, respectively. Functioning as holding or sealing contacts for the relay 9S are the contacts 9S6. Initial energization of the relay 9S, it might be explained, is by reason of a pair of contacts 12S1 closed by a call relay 12S treated more fully hereinafter. Through the agency of the contacts 9S7 the units transmitting relay 11S is energized, this also being better understood later on when the reason for including the read-out relay in the circuitry will be presented more fully.

Having described all of the relays intimately associated with the storage unit, one other feature of this unit will be dealt with before passing on to the transmitter unit. This feature concerns the ability of the storage unit to identify itself when called upon to do so. To achieve this aim, a pair of manually adjustable selector switches 12SA and 13SA are employed, these switches being mechanically independent of each other and each having ten contact points plus rotatable arms 12SA12, 13SA12, respectively. Electrical connection of these arms with the transmitter is had via the contacts 9S8, 9S9 actuatable by the relay 9S.

Figure 2:
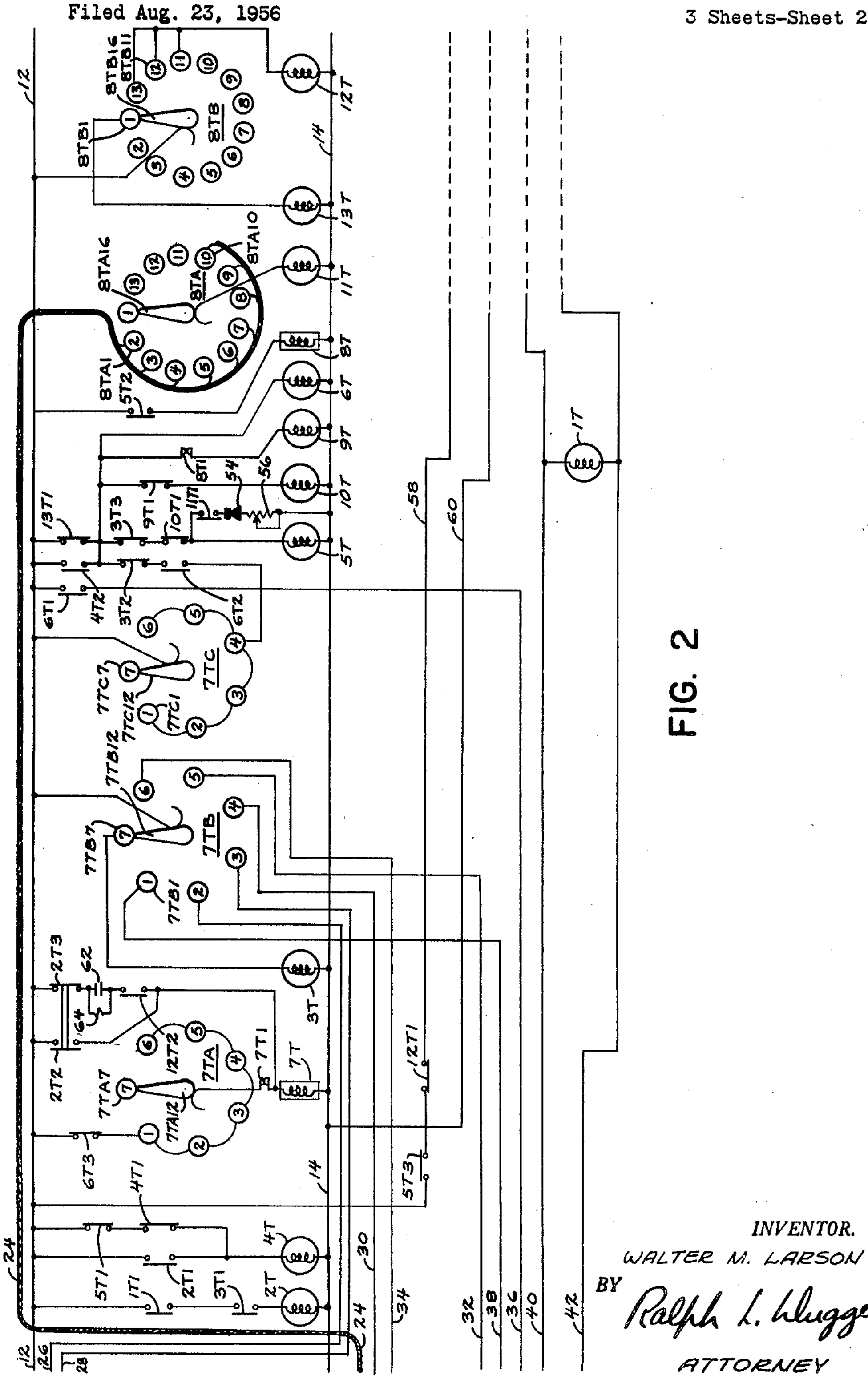
Figure 2 is a similar type of circuit, this view dealing with the transmitter unit but having a number of conductors interconnected with the storage unit of Figure 1, and Figure 3 schematically diagrams the receiver unit portion of the system, certain conductors hereagain extending to the other units.

Since it is contemplated that the storage unit be located in a proximal relation with respect to the transmitter and that certain conductors extend between Figures 1 and 2, it will prove of benefit to identify in a specific manner the interconnecting conductors extending between these two units, although placing the two drawing sheets end to end will also serve this same purpose. Accordingly, a cable composed of ten conductors has been denoted by the numeral 24, one of these conductors of this cable having electrical communication with all of the number one contacts 4SA1, 5SA1, 6SA1, 7SA1 of the stepping switch levels 4SA, 5SA, 6SA, 7SA, respectively, and the number one contacts 12SA1, 13SA1 of the station selector switches 12SA, 13SA, respectively, the second of these conductors having communication with all of the number two contacts 4SA2, 5SA2, 6SA2, 7SA2, 12SA2, 13SA2 and so on for all ten contacts of each switch level 4SA, 5SA, 6SA and 7SA, as well as the selector switches 12SA and 13SA. Additionally, there are conductors 26, 28 and 30 leading from the contacts 9S3, 9S4 and 9S5, which as already stated are in circuit with the rotatable arms of the switch levels 5SA, 6SA and 7SA. Conductors 32, 34 extend from the contacts 9S8, 9S9 which are associated with the arms 12SA12 and 13SA12. Still further, there is a conductor 36 connected to the contacts 9S6 and a conductor 38 attached to the contacts 9S7. Through the medium of a pair of conductors 40, 42, the call relay 9S may be energized.

*Transmitter unit*

Directing attention now to Figure 2, it will be observed that the positive bus 12 and negative bus 14 have been extended from Figure 1 to this figure. A set of contacts 1T1 are actuated by a call relay 1T to energize a pre-start relay 2T through a pair of normally open contacts 3T1 when these contacts are closed. The call relay 1T is energized by the same conductors 40, 42 that extend to the call relay 12S located in the storage unit. The contacts 3T1 are carried on a transmission conditioning relay 3T having additionally two pairs of normally closed contacts 3T2 and 3T3. Mounted for movement on the pre-start relay 2T are normally open contacts 2T1, 2T2 and normally closed contacts 2T3. The contacts 2T1, when closed, pick up a secondary relay 4T, this being the actual start relay, which will seal itself through its contacts 4T1 inasmuch as these contacts 4T1 are in circuit with a pair of normally closed contacts 5T1 on a fast operate pulsing relay 5T. In addition to its contacts 4T1 the start relay 4T carries contacts 4T2, and in addition to its contacts 5T1 the pulsing relay controls contacts 5T2 and 5T3, all of these contacts being normally open. By virtue of its contacts 4T2 energization of the actual start relay 4T will close its contacts 4T2 to energize a transmission maintenance relay 6T, this latter relay having normally open contacts 6T1 in circuit with the conductor 36 leading from the previously mentioned read-out relay 9S of the storage unit when its hold contacts 9S6 are closed. The relay 6T is further provided with normally open contacts 6T2 and normally closed contacts 6T3. At any rate, it will be recognized that contacts 6T1 will function to seal in the relay 9S of the storage unit once it is energized by way of the contacts 12S1, this condition prevailing until release by relay 6T. Due to the fact that this happening is interrelated with an operational sequence subsequently to be described with greater particularity, further description can well be postponed until said operational sequence is considered.

Before the transmitter unit can transmit information from the storage unit, it must be capable of handling the stored information. Toward this end, the contacts 2T2 close upon energization of the relay 2T to apply voltage to a solenoid 7T forming a part of a sequencing or digital selector stepping switch having three levels 7TA—7TB—7TC, each with seven contacts and a rotatable arm 7TA12, 7TB12, 7TC12. As with the stepping switches in the storage unit, energization of the solenoid 7T acts to cock a spring biased pawl. Inasmuch as it is planned that the contacts 1T1 will be only momentarily closed by the relay 1T the arms 7TA12, 7TB12, 7TC12 will be simultaneously advanced, being mechanically coupled to each other, when the contacts 1T1 separate (as they will do when the relay 1T is de-energized) to move the arms 7TA12, 7TB12, 7TC12 to their first contact points 7TA1, 7TB1, 7TC1, respectively. Owing to the presence of a set of self-interrupting contacts 7T1, however, the stepping switch 7TA—7TB—7TC is then capable of automatically stepping itself around to its home position on contact point seven. This will be considered more fully during a specific operation of the system.

Notice should be taken at this time that the conductor 38 is connected to the contact 7TB1, the conductor 26 to the contact 7TB2, the conductor 28 to the contact 7TB3, the conductor 30 to contact 7TB4, conductor 32 to contact 7TB5 and conductor 34 to contact 7TB6, these all being contact points on switch level 7TB. Hence, as its name implies the stepping switch 7TA—7TB—7TC functions to provide in a successively selective manner conductive paths from the various stepping switches contained in the storage unit.

However, need exists for the distributing or feeding of the various orders of digital information, including the station identifying information, to the receiver unit. This role is played by a distributor solenoid 8T operatively associated with a stepping switch composed of two levels 8TA and 8TB, each level with thirteen contact points and a rotatable contact arm 8TA16, 8TB16, respectively. Inasmuch as the solenoid 8T is in circuit with the contacts 5T2 of the pulsing relay 5T it will be appreciated that the solenoid 8T is energized each time that the relay 5T is activated. Operated by the solenoid 8T is a pair of normally closed contacts 8T1 which are in a serial relationship with a secondary relay 9T for the solenoid 8T, this secondary relay being equipped with a set of normally closed contacts 9T1. The contacts 9T1 in turn are in series with a pulse interrupter relay 10T for the pulsing relay 5T, the relay 10T being capable of effecting this interruption because of normally closed contacts 10T1 in circuit with said 5T relay. In this regard, it will be understood that the de-energization of the pulsing relay 5T accomplishes a release of the contacts 5T2 to de-energize the solenoid 8T to cause the actual incremental advancement of the arms 8TA16 and 8TB16, these arms being mechanically coupled together for simultaneous movement. In other words, a closing and opening of the contacts 5T2 will effect a distributor stepping switch advancement of one contact point. To do this, though, what might be termed a pumping action is produced by the interplay of the stepping switch 8TA—8TB and the 5T, 9T, 10T relays.

Connected in circuit with the rotatable arm 8TA16 of the switch level 8TA is a long pulse initiating relay 11T provided with a pair of normally open contacts 11T1 in series with a selenium rectifier 54 and a resistor 56, the contacts 11T1, rectifier 54 and resistor 56 shunting the pulsing relay 5T. It is through the instrumentality of the rectifier 54 that the relay 5T is given a slow release aspect whenever the relay 11T is energized. In passing, it may be mentioned that the specific contact point of the 8TA level causing energization of the relay 11T is determined by the corresponding contact point of the particular stepping switch in the storage unit which is then engaged by its rotatable arm and which stepping switch is then being sequenced by the switch level 7TB12. The slow release attribute, however, provides a long pulse that is transmitted in the illustrated situation via a pair of wires or lines 58, 60 to the receiver unit, because the contacts 5T3 will be closed for a longer period of time due to the prolonged energization of the pulsing relay 5T. Except for this single long pulse, all of the other pulses produced by the pulsing relay 5T will be of short duration for a single complete sweep of the arm 8TA16. More will be said hereinafter concerning what the long pulse accomplishes when it reaches the receiver unit. Having made specific reference to the physical wire circuit 58, 60, comment should perhaps be presented with respect to the fact that the system lends itself readily to transmission via other communication media as well, it being entirely feasible to employ microwave propagation, various radio channels of lower than microwave frequency, and carrier frequency transmission in conjunction with existing power lines. Those familiar with this art will recognize that discrete digital pulses can be transmitted by all of these various media.

Attention is now drawn to switch level 8TB where it will be observed that the contacts 8TB10, 8TB11 and 8TB12 are all commoned together and are connected as a single group to a non-transmit relay 12T equipped with a pair of normally closed contacts 12T1 in circuit with contacts 5T3 and the conductors 58, 60, as well as normally open contacts 12T2. Through the agency of the contacts 12T1 there is a time interval provided during which there can be no transmitting of pulses over the conductors 58, 60 (or other media) to the receiver unit. Insurance against a premature advancement of the stepping switch 7TA—7TB—7TC to its home position on contacts 7TA7, 7TB7, 7TC7 during the period that the relay 12T is energized is provided in the form of the contacts 12T2 which will then be closed. Closure of the contacts 12T2, it may be explained, connects a condenser 62 having a capacitance of 40 $\mu$f and a shunting resistor 64 in circuit with the solenoid 7T and the resulting surge of current assures energization of the solenoid 7T for a time sufficient to allow the arm 8TB16 to reach its home position on contact 8TB13 before drop out of the solenoid 7T, the drop out or de-energization of this solenoid serving to permit the spring biased pawl of the selector switch 7TA—7TB—7TC to cause advancement. Stated somewhat differently, this selector switch should not be advanced to its next successive contact point until the preceding read-out has been completed.

Another relay associated with the switch level 8TB is a homing relay 13T which picks up its contacts 13T1 when the distributor stepping switch 8TA—8TB reaches its 8TA13, 8TB13 contact position.

*Receiver unit*

Figure 3:
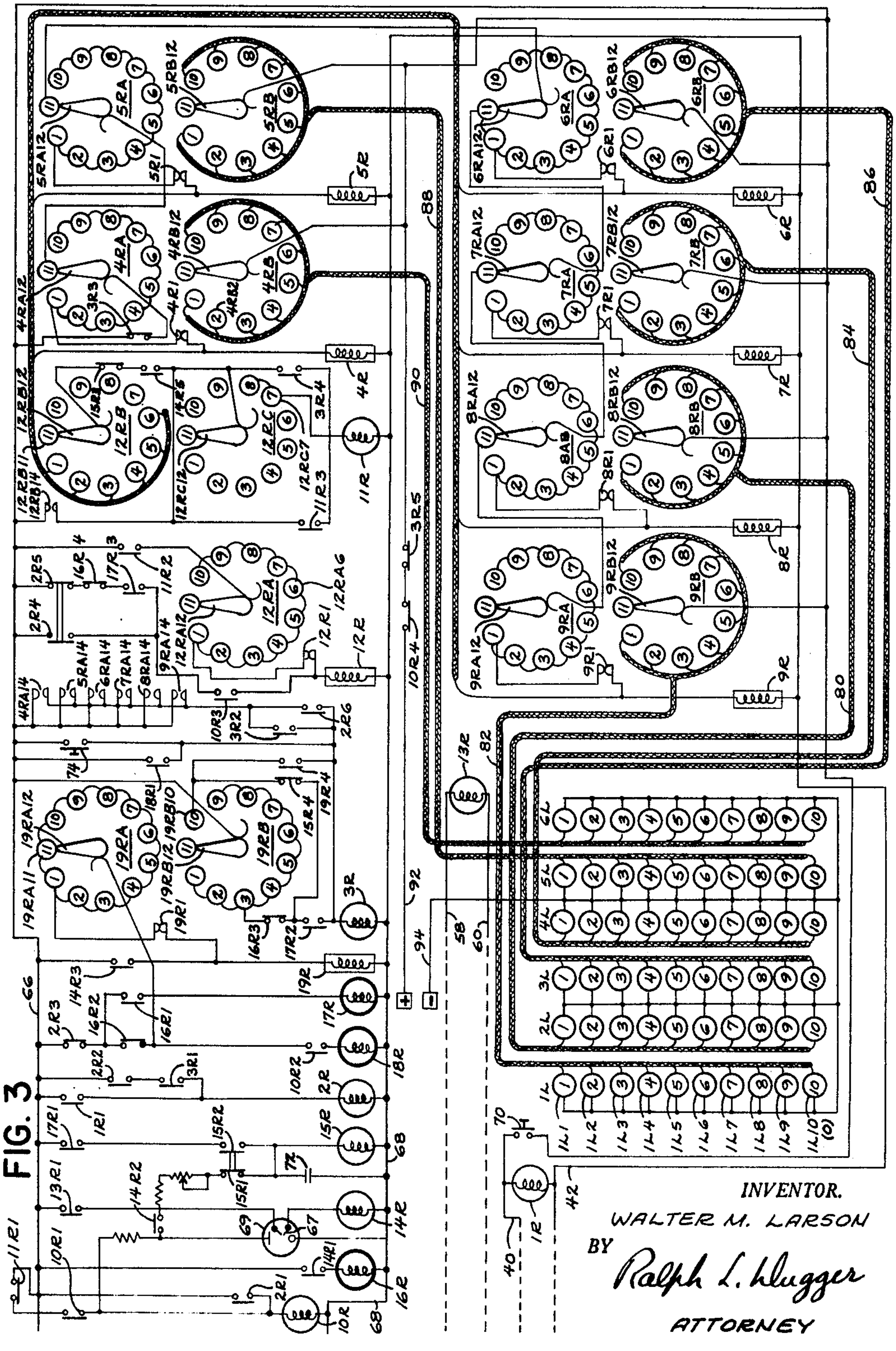

Passing now to Figure 3 it will be observed that there is depicted a positive bus 66 and a negative bus 68. These buses may serve to energize the conductors 40 and 42 leading to both the storage and transmitter units when a master call push button 70 is depressed at the central dispatch station where the receiver is located. Also, this push button energizes a call relay 1R also connected across the previously mentioned conductors 40 and 42, thereby picking up a set of normally open contacts 1R1 simultaneously with the contacts 12S1 and 1T1. These contacts 1R1 are in circuit with a telemetering set-up relay 2R provided with a number of pairs of contacts 2R1, 2R2, 2R3, 2R4, 2R5, and 2R6. As can be observed from the drawing, contacts 2R1, 2R2, 2R4 and 2R6 are normally open, whereas contacts 2R3 and 2R5 are normally closed. Providing a set of normally open contacts 3R1 are closed, the set-up relay 2R will seal itself in. The contacts 3R1 are carried on a reset or cancel relay 3R which relay also has several other sets of contacts 3R2, 3R3, 3R4 which are all normally open together with a set of contacts 3R5 which is normally closed. The operation of the reset relay is inextricably interwoven with other circuit components yet to be described so its specific functioning will be better reserved for later discussion.

Corresponding in number to the stepping switches actuated by the solenoids 4S, 5S, 6S, 7S plus the manually adjustable selector switches 12SA and 13SA is a plurality of stepping switch solenoids 4R, 5R, 6R, 7R, 8R and 9R, each equipped with self-interrupting contacts 4R1, 5R1, 6R1, 7R1, 8R1, 9R1 and each controlling a stepping switch composed of two banks or levels having eleven contact points. Thus it will be observed that the solenoid 4R actuates switch levels 4RA and 4RB, 5R actuates levels 5RA and 5RB and so on through levels 9RA and 9RB, which last-named levels are actuated by solenoid 9R. These various switch levels include rotatable arms 4RA12, 4RB12, 5RA12, 5RB12, 6RA12, 6RB12, 7RA12, 7RB12, 8RA12, 8RB12, 9RA12, 9RB12. By cam action derived from the rotation of the various rotatable arms 4RA12, 5RA12, 6RA12, 7RA12, 8RA12, 9RA12 what are commonly termed off-normal contacts 4RA14, 5RA14, 6RA14, 7RA14, 8RA14, 9RA14 are moved from an open position (as shown) when the various arms are on their eleventh contact point, i.e., 4RA11, 5RA11, etc. to a closed position when on all other contact points. The contacts 2R6 are in series with these off-normal contacts, whereby reset relay 3R will pick up if any one of the above-mentioned off-normal contacts is closed. Due to the presence of contacts 3R2 in parallel with contacts 2R6 the 3R relay is capable of sealing itself in until all six off-normal contacts 4RA14, 5RA14, 6RA14, 7RA14, 8RA14, 9RA14 are open. The relay 2R is also influenced by this set of conditions, for contacts 3R1 serve to maintain this relay energized.

There is a receiver maintaining relay 10R having three sets of normally open contacts 10R1, 10R2, 10R3 and a set of normally closed contacts 10R4. At this time the presence of a digit selector resetting relay 11R may be mentioned, although basis for its circuit relation has not yet been given, this relay possessing a pair of normally closed contacts 11R1 and two pairs of normally open contacts 11R2, 11R3. Through the intermediary of the contacts 11R1 the receiver maintaining relay 10R is enabled to seal itself in upon closure of its contacts 10R1.

A digit selector solenoid 12R provided with self-interrupting contacts 12R1 is the operator for a three-level stepping switch comprised of levels 12RA, 12RB, 12RC including rotatable arms 12RA12, 12RB12, 12RC12, respectively, all connected for rotation in unison as have the earlier described arms of the multi-level stepping switches. Actuatable in accordance with the rotation of the contact arm 12RA12, together with the other two contact arms 12RB12 and 12RC12, is a set of off-normal contacts 12RA14 which is open only when the arm 12RA12 is in its home position on contact 12RA11.

The foregoing description of the receiver unit has been concerned with the conditioning of the system for informational impulses from the transmitter unit via the conductors or lines 58, 60. Upon arrival at the receiver unit the pulse are fed to a pulse receiving relay 13R equipped with a pair of normally open contacts 13R1. The contacts 13R1 are in circuit with a jumper 67 associated with a constant voltage tube 69 and a fast operating pulsing relay 14R for the various stepping switches already mentioned, as well as a further one presently to be identified. By virtue of the jumper 67 the circuit to the relay coil 14R is opened whenever the constant voltage tube is removed from its socket and the relay 14R is thereby rendered inoperative. The relay 14R carries a plurality of contacts labeled 14R1, 14R2, 14R3, 14R4, 14R5, all normally open. The relay 14R is responsive to pulses that are either short or long; a long pulse detecting relay 15R, however, is additionally employed, this relay having contacts 15R1 that are normally closed, contacts 15R2 that are normally open and 15R3, 15R4 that are normally closed. A1 $\mu$f. condenser 72 is connected across the long pulse detecting relay and will be charged sufficiently upon receipt of a long pulse so that the relay 15R will pick up, then sealing itself through its holding contacts 15R2; otherwise this relay will remain de-energized, since receipt of a long pulse is mandatory in order to cause its initial energization, which energization is then maintained through said contacts 15R2. It is believed obvious that a long pulse received via the lines 58, 60 will pick up the pulse receiving relay 13R for a longer period when the transmitted long pulse is impressed thereon as compared to when only short pulses are transmitted. As a consequence of this, the pulsing relay 14R will remain energized longer than is usual and hence its contacts 14R2 act to impress a sufficient charge on the condenser 72; short pulses will not. The contacts 15R2 afford a holding path for the relay 15R.

An impulse sequence detector relay 16R, possessing fast operate-slow release characteristics, carries a set of normally open contacts 16R1 and several sets of normally closed contacts 16R2, 16R3 and 16R4. Serving as an auxiliary relay for the relay 16R is a slow operate, slow release relay having three sets of normally open contacts 17R1, 17R2, 17R3.

A time delay relay 18R, that is, a relay having slow release properties, is in circuit with the contacts 16R2 mentioned in the preceding paragraph, together with the earlier referred to contacts 2R3 and 10R2. Carried by this relay is a pair of contacts 18R1 in parallel with cancel push button contacts 74, the cancel push button being manually actuatable.

There is a vertification stepping switch operable by a solenoid 19R, this switch including two switch levels 19RA and 19RB, each with eleven contact points, and a rotable arm 19RA12 for the level 19RA and an arm 19RB12 for the other level 19RB. All of the contacts of level 19RA with the exception of contact 19RA11 are commoned to a self-interrupting set of contacts 19R1 controlled by the solenoid 19R and capable of returning the stepping switch 19RA—19RB to its home position onto its eleventh contact when relay 16R has dropped out, since then an electrical path is established through the contacts 16R2 of said relay 16R.

For the purpose of providing a ready and convenient read-out of the information transmitted to the receiver unit a lamp bank designated in its entirety by the letter L is utilized. As can be discerned from the drawing, this lamp bank comprises six columns IL, 2L, 3L, 4L, 5L and 6L. As arranged, the columns 1L, 2L are representative of the station identification digits and connected to the switches 8RA—8RB and 9RA—9RB by a pair of cables 80, 82, each having ten conductors therein. The column 3L is indicative of the "thousands" that have been transmitted and is connected by a cable 84 to the switch 7RA—7RB. Similarly the "hundreds" that have been received are registered on the column 4L, being connected to the switch 6RA—6RB by a ten conductor cable 86. Likewise the "tens" column 5L and the "units" column are connected to their respective switches 5RA—5RB and 4RA—4RB by cables 88 and 90. Each of the columns includes ten lamps. In the detailed operation that is to follow the lamps will be referred to in a manner resembling the relays and their contacts. For instance, when the "units" column 6L is reading "2," then this condition of registration will be denoted as "6L2."

Energization for the lamp bank L is furnished by way of a positive bus 92 and a negative bus 94, the latter being common to one side of each lamp as is clearly visible in the drawing. Especial note should be taken of the fact that the earlier alluded to contacts 3R5 and 10R4 are located in series with each other in the bus 92, the opening of either of these two normally closed sets of contacts by their relays 3R and 10R acting to disconnect the entire lamp bank L so that no reading can then be made. As will be better understood from several detailed happenings to be described hereinafter, the lamp bank L will be automatically deenergized should circumstances dictate such action in order to preclude any possibility of obtaining an erroneous reading.

*Typical operation*

Having in mind the foregoing circuit arrangement involving the various components referred to, it is believed that a complete understanding and appreciation of the entire invention may be had from an operational description thereof. With a typical or normal functioning in mind it will first be supposed that a number representing 6,642 kilowatt-hours is in the process of being stored in the storage unit and that this is progressively occurring at a substation having assigned thereto the identifying number "36." At the outset then, the arm 13SA12 of the selector switch 13SA is normally moved to its third contact point, i.e., to contact 13SA3, and the arm 12SA12 of the selector switch 12SA is moved to its sixth contact point or contact 12SA6. Obviously, these selector switches 12SA, 13SA will not have to be changed unless there is a re-assignment of station numbers.

Although the telemetering system forming the subject matter of the present invention may be expanded for operation where a larger number of digits is to be handled, we are herein concerned with the accumulation of a four digit number, namely, "6,642." Consequently, in registering the units, the kilowatt-hour contacts 10 will have closed 6,642 times, each closure picking up the contacts 1S1 via the relay 1S. Inasmuch as the contacts 3S3 are closed when the contacts 1S1 first pick up, the units operator relay 2S becomes energized, thereby closing its contacts 2S1, as well as its contacts 2S2. The closing of the contacts 2S1 of course establishes a circuit to the relay 3S, whereas closure of the contacts occasions an initial energization of the solenoid 4S which is the actuator for the "units" stepping switch 4SA—4SB. The solenoid 4S will remain energized until the contacts 2S2 drop out. Before the contacts 2S2 open, however, the relay 3S must have had time to open its contacts 3S3 and close its holding contacts 3S1. Being a slow operate relay there is a slight delay injected into the system because of this slow acting relay, but even after the contacts 3S3 have picked up there is an additional delay by reason of the fact that the relay 2S is a slow release one, taking approximately 0.25 second to release after the contacts 3S3 have separated. Thus, it will be observed that the solenoid has ample time to trigger its pawl, the de-energization of this solenoid thereafter permitting spring advancement of the arm 4SA12 to the first contact 4SA1, together with a simultaneous advancement of the arm 4SB12 to its contact 4SB1 inasmuch as the two arms are coupled to each other. It is to be noted that even if the kilowatt-hour contacts 10 should remain closed for a prolonged period, there can be no interference with the advancing or stepping action, for this takes place automatically even if the contacts 1S1 remain closed indefinitely. Also, it will be observed that there can be no repetitive cycling action which will advance the arms 4SA12, 4SB12 more than the one contact point to produce an erroneous storage. Of course, if kilowatt-hours are being registered at a rapid rate the contacts 10 will close and then open to de-energize relay 1S almost immediately, the contacts 1S1 then dropping out relay 2S, although there will still be the 0.25 second delay owing to the slow release feature incorporated into relay 2S. However, when the kilowatt-hour contacts 10 close for the second time the above action will repeat itself and so on for the many times that are necessary to accumulate the number we have arbitrarily selected.

Of especial interest is the stepping of the switch 4SA—4SB from its ninth contact point to its tenth contact point. The reaching of contact 4SA10 and 4SB10 is of significance because a transfer to the "tens" switch 5SA—5SB is then needed. Recapitulating somewhat, it will be recalled that the picking up of relay 3B serves to open contacts 3S3 to drop out relay 2S which through the agency of its contacts 2S2 de-energizes solenoid 4S. However, in storing the tenth integer, as with the others, relay 3S will not drop out until contacts 1S1 are opened. Since relay 3S has a slow release feature and is equipped with contacts 3S2, these contacts 3S2 will actually remain closed for a brief period after advancement of the arm 4SB12 to the tenth contact 4SB10. This brief period, however, is ample to energize solenoid 5S through contacts 8S1 and 9S1 which at this time are closed. Of course, energization of solenoid 5S is responsible for triggering the pawl on the stepping switch 5SA—5SB. The contacts 8S1, however, are under the control of the slow operate relay 8S and soon open since there is an electrical path provided to the relay 8S via contacts 10S1 due to engagement of the arm 4SB12 with contact 4SB10. It is only by virtue of the delay in the opening of contacts 8S1 that the solenoid 5S can operate, for once the contacts 8S1 separate, the solenoid 5S is deenergized and the arms 5SA12, 5SB12 are spring advanced to their first contacts 5SA1, 5SB1. Hence, it will be recognized that the above units pulse breaking relay 8S acts to break the circuit to the solenoid 5S after momentary energization of this solenoid. This is approximately 0.1 second after the relay 8S has been energized. The relay 8S will remain energized as long as the arm 4SB12 remains on its tenth contact 4SB10.

The above transfer action will happen each time the arm 4SB12 reaches its tenth contact 4SB10 and after ten such instances it will be appreciated that the arms 5SA12 and 5SB12 will be stepped around to their tenth contacts 5SA10, 5SB10. In reaching its ninth contact 5SB9, however, the switch level 5SB establishes a circuit to the solenoid 6S of the "hundreds" stepping switch 6SA—6SB, energizing this solenoid to trigger the actuating pawl for this switch 6SA—6SB. Inasmuch as this electrical path between buses 12 and 14 is not readily discernible, it may be pointed out that the circuit exists through the arm 4SB12, the contact 4SB10, the contacts 3S2 which are at this moment closed, the contacts 8S1, the contacts 9S1, the conductors 16, 18 and 20, the arm 5SB12, the contact 5SB9 and the solenoid 6S. This circuit will prevail until the relay 8S has had an opportunity to open its contacts 8S1. The arms 6SA12, 6SB12 are then permitted to be spring advanced to their tenth contacts 6SA10, 6SB10. At this moment the arms 5SA12, 5SB12 are also advancing since the only time that the arms 6SA12, 6SB12 will advance is when the arms 5SA12, 5SB12 move from their ninth to tenth contact position.

As for transferring from the "hundreds" stepping switch 6SA—6SB to the "thousands" it is to be noted that the solenoid 7S is connected to the ninth contact 6SB9 on the switch level 6SB and when the arm 6SB12 reaches this contact the circuit is as far as the "hundreds," an extension of the circuit being by way of conductor 22.

When the number "6,000" is stored, there will be no further advancement of the arms 7SA12, 7SB12, these arms now being on their sixth contact 7SA6, 7SB6. However, the "units," "tens" and "hundreds" switches will continue to be stepped until the arms 6SA12, 6SB12 come to rest on their contacts 6SA6, 6SB6, thereby storing the number "6,600." The "units" and "tens" stepping switches will still be operated until the arms 5SA12, 5SB12 have been rotated onto their fourth contacts 5SA4, 5SB4. At this time the number "6,640" has been stored. When the arms 4SA12, 4SB12 are advanced to their second contacts, that is contacts 4SA2, 4SB2 the arbitrarily selected number "6,642" will have been stored. Having already set the selector switches 12SA, 13SA on their sixth and third contacts, respectively, the storage system has been readied for an exemplary read-out of the numerical information at this time. Of course a readout could be obtained at any time, but we adopted a specific number for purposes of illustration.

To inaugurate a read-out the call push button 70 is depressed at the receiver unit, thereby energizing the several relays 12S, 1T and 1R so as to pick up their respective contacts 12S1, 1T1 and 1R1. Closing of the contacts 1T1 of the transmitter unit will pick up the pre-start relay 2T through contacts 3T1, these latter contacts being closed when the transmission conditioning relay 3T is energized as it will be when the digital selector switch level 7TB has its arm 7TB12 in its home position, that is on contact 7TB7. Thus, the contacts 2T1 belonging to relay 2T will close to pick up the actual start relay 4T. Through the agency of the contacts 5T1 and the contacts 4T1 this actual start relay is capable of holding itself energized. More importantly, though, the relay 4T will close its contacts 4T2, thereby causing energization of the transmission maintenance relay 6T. Due to the fact that the relay 6T has a set of normally open contacts 6T1 in series with the conductor 36 leading to the storage unit, it will be apparent that the read-out relay 9S of the storage relay will be maintained in an energized condition, this relay having been initially energized by closure of the contacts 12S1 when the call push button 70 was depressed to activate the relay 12S along with the other relays 1T and 1R. Therefore, even though the call button 70 is released the read-out relay 9S will stay energized, governed of course by the contacts 6T1.

Simultaneously with the foregoing happening the pre-start relay 2T causes its contacts 2T2 to close, whereby the solenoid 7T of the digital selector stepping switch 7TA—7TB—7TC is energized to trigger its pawl. When the call button 70 is released, though, the pre-start relay 2T will immediately drop out because of its circuit relation with the contacts 1T1; this de-energizes the solenoid 7T and the arms 7TA12, 7TB12, 7TC12 are all spring advanced in unison from their seventh or home contact to their first contact. The advancement of the arm 7TB12 from the contact 7TB7 to the contact 7TB1 results in a circuit interruption as far as the transmission conditioning relay 3T is concerned and it will drop out.

Engagement of the rotatable arm 7TB12 with contact 7TB1, however, provides an electrical path via the conductor 38 to the units transmitting relay 11S through the intervening contacts 9S7 which are now closed because of the energized state of the read-out relay 9S at this time. Energization of relay 11S is instrumental in connecting the rotatable arm 4SA12 to the bus 12. Each of the contacts 4SA1, 2, 3, 4, 5, 6, 7, 8, 9 and 10, it will be recalled, are electrically connected to the contacts 8TA1, 2, 3, 4, 5, 6, 7, 8, 9 and 10 of the transmitter unit distributor switch level 8TA via the inter unit cable 24. In this manner the storage unit and the transmitter unit have been conditioned for a read-out of the "units" information.

Backtracking somewhat at this time to when the transmission conditioning relay dropped out, this relay having dropped out when the arm 7TB12 was stepped to contact 7TB1, it will be discerned that this recreated a circuit, this being a second one, from the extended positive bus 12 (Figure 2) to the relay 6T to the negative bus 14, this course being through arm 7TC12, contact 7TC1, contacts 6T2 (now closed), contacts 3T2 (now closed) because relay 3T has dropped out directly to the relay 6T which has its other side connected to the bus 14.

Closing of the contacts 3T3 also belonging to the relay 3T will provide a path to the pulsing relay 5T, operation of relay 5T of course closing the normally open contacts 5T2 in circuit with solenoid 8T to cause energization of this solenoid and thereby trigger the spring biased pawl of the distributor stepping switch 8TA—8TB.

From the moment that the transmission maintenance relay 6T was first energized a pumping action was initiated, for then contacts 8T1 carried by the solenoid 8T were closed, thus completing a circuit to the relay 9T which relay opened its contacts 9T1. By virtue of this happening assurance was had that the contacts 10T1 in circuit with the pulsing relay 5T would be closed so that said relay 5T could be energized. It was upon the energization of the solenoid 8T, as outlined in the preceding paragraph, that the circuit through the contacts 8T1 was broken with the consequence that relay 9T dropped out, closing its contacts 9T1 to energize the interrupter relay 10T for the pulsing relay 5T. As explained somewhat earlier, the contacts 5T2 carried by the pulsing relay 5T caused energization of the solenoid 8T and by the same token when these contacts open, as they will when contacts 10T1 interrupt the circuit to relay 5T, the solenoid is de-energized and the arms 8TA16, 8TB16 are spring advanced from their thirteenth contact position to their first contact position. This action returns the contacts 8T1 to a closed position, thereby energizing the relay 9T once again with the accompanying de-energization of the relay 10T. Stated more succinctly, each time that the pulsing relay 5T is energized and de-energized the distributor stepping switch 8TA—8TB is advanced one contact.

Under the conditions we have assumed the switch arm 4SA12 of the stepping switch level 4SA is engaged with the second contact 4SA2 of this switch level, the total of "6,642" having been selected. Consequently, successive advancement of the arm 8TA16 to only the second contact 8TA2 will establish a circuit which may be traced from the positive bus 12 through the arm 4SA12, the contact 4SA2, the cable 24 to the contact 8TA2, the arm 8TA16 to the long pulse initiating relay 11T. At this particular time the pulsing relay 5T will not be energized, for the contacts 10T1 will be open. However, the relay 11T does place the rectifier 54 across the relay 5T in anticipation of the next time the relay 5T is energized, for the relay 11T upon energization thereof will close its contacts 11T1 to include the rectifier 54 in parallel relation with the relay 5T. Therefore, by reason of the now connected rectifier 54 and the resistor 56 the relay 5T is rendered slow release on its next drop out. Hence, the next pulse after the picking up of the long pulse initiating relay 11T will be a long one. In the exemplified instance, the relay 11T is picked up when the arm 8TA16 makes contact with contact 8TA2 and the next succeeding energization will maintain the picking relay 5T closed for a longer period through the agency of the rectifier 54. This serves to keep the contacts 5T2 closed longer, too, so the arm 8TA16 does not actually advance to its third contact 8TA3; more important is the fact that the contacts 5T3 in the transmission line 58 are held closed longer and thus a long pulse will be transmitted over the lines 58, 60. More will be said shortly about this long transmitted pulse.

Once the arm 8TA16 leaves the second contact 8TA2, as it will do when the sustaining effect of the rectifier 54 diminishes sufficiently, the circuit to the relay 11T will be interrupted and it too falls out. The relay 11T will not be energized again during this rotational trip of the arm 8TA16, so there will be no more long pulses produced during the remainder of the contact steps; instead only short pulses will be produced.

When the arm 8TA16 has wiped ten contacts, the scanning of the "units" switch level 4SA will have been completed. However, it is extremely desirable that such completion be manifested; hence the provision of the contacts 8TB11 and 8TB12 on the level 8TB. Joined electrically to these contacts is contact 8TB10 and the thus commoned contacts are connected to the non-transmit relay 12T. Owings to the presence of the contacts 12T1 on this last-mentioned relay, these contacts will be opened after transmission of the tenth pulse over the lines 58, 60. Particular note should be taken that the tenth pulse is transmitted prior to interruption of the transmission circuit by way of the contacts 12T1. Stated somewhat differently, relay 12T makes certain that no more than ten pulses are sent out over the transmission lines 58, 60.

Also, energization of the non-transmit relay 12T will close the contacts 12T2 of this relay, thereby energizing the selector solenoid 7T during the above-described non-transmit interval via the condenser 62. However, the condenser 62 will permit only a momentary passage of current upon closure of the contacts 12T2 because the condenser quickly becomes charged whereupon it blocks further flow of current. This cessation of current flow will cause the solenoid 7T to become de-energized, spring action advancing the arms 7TA12, 7TB12, 7TC12 of the digital selector stepping switch 7TA—7TB—7TC to its second contact position. In this way assurance is obtained that the arm 7TB12 will be on contact 7TB2 before the start of the next scanning cycle of level 8TA.

Now the conductor 26 is activated, for this conductor is attached to contact 7TB2. It is to be discerned that the conductor leads to level 5SA of the "tens" stepping switch 5SA—5SB of the storage unit via the contacts 9S3. Rotation of the arm 7TB12, of course, disconnected the conductor 38 from the level 7TB of selector switch 7TA—7TB—7TC, thus dropping out the units transmitting relay 11S and thereby opening its contacts 11S3 that during the "units" scanning had been established an electrical circuit to the distributor stepping switch level 8TA. Therefore, the switch level 5SA has been substituted for the previously included switch level 4SA, as far as the next or "tens" scanning sequence is concerned.

As far as the pumping action involving the distributor stepping switch 8TA—8TB, the relay 9T, the relay 10T and the pulsing relay 5T are collectively concerned, it is the same for scaning the "tens" switch level 5SA. However, in this instance the arm 5SA12 is engaged with the fourth contact 5SA4 so the long pulse initiating relay 11T will pick up when the distributor arm 8TA16 reaches its fourth contact 8TA4 rather than the second position, it being remembered that we have originally stored the number "6,642." It is not believed necessary to elaborate further on this phase of the operation.

After the relay 12T has been picked up at the end of the "tens" transmission, that is after the transmission of ten pulses during the scanning of the switch level 5SA, the digital selector switch 7TA—7TB—7TC will be advanced another contact point, the arm 7TB12 now assuming an angular position placing it in engagement with the third contact 7TB3. To this third contact is connected the conductor 28 leading to the contacts 9S4 which tie in with the arm 6SA12 of the "hundreds" switch level 6SA. Here, it will be remembered, the arm 6SA12 is resting on the sixth contact 6SA6 so the long pulse initiating relay 11T will be picked up when the arm 8TA16 reaches the corresponding contact which of course is contact 8TA6. As with the "units" and "tens" scanning sequences, termination of ten transmitted pulses will be manifested by operation of the non-transmit relay 12T.

Upon advancement of the digital selector arm 7TB12 to its fourth position, i.e. on contact 7TB4, use will be made of the conductor 30 running to the contacts 9S5 in circuit with the arm 7SA12 of the "thousands" switch 7SA—7SB. Inasmuch as the read-out relay 9S remains energized throughout all these scanning operations, the contacts 9S5 controlled thereby are closed and the scanning takes place as with the lower order digits just described, the long pulse initiating relay being energized when the distributor arm 8TA16 reaches the sixth contact 8TA6. In identical fashion, the relay 12T is operated at the conclusion of ten transmitted pulses and with the closing and opening of its contacts 12T2 the solenoid 7T is once again energized and de-energized to step the arm 7TB12 to its fifth position or contact 7TB5.

Due to the fact that a four digit system was selected for illustrating the invention, the transmission of accumulated numerical data has been completed. However, still left for transmission are the station identifying digits "36." The first of these digits to be transmitted is the six contained in the selector switch 12SA. As stated above, the digital selector switch level 7TB has had its arm 7TB12 advanced to contact 7TB5, thereby connecting the conductor 32 to the selector switch. This conductor 32 extends to the contacts 9S8 and the contacts 9S8 communicate with the rotatable arm 12SA12. Like the actual numerical data or measurand reading, this distributor arm 8TA16 which it reaches the sixth contact 8TA6 will cause the long pulse initiating relay 11T to be picked up, thereby causing transmission of a long pulse upon the suceeding energization of the pulsing relay 5T. All of the other pulses will be of short duration. At the conclusion of ten pulses, including of course the single long pulse, the non-transmit relay 12T will again be energized to produce a non-transmit interval and the selector switch 7TA—7TB—7TC will have its arm 7TB12 advanced to the sixth contact 7TB6. This brings the conductor 34 into active use, paving the way for scanning of the selector switch 13SA. Since the switch 13SA has its arm 13SA12 bearing on the third contact 13SA3, the long pulse will be produced after the relay 11T has been picked up by the distributor arm 8TA16 having reached the third contact 8TA3.

It will be recalled that the transmitter was made active by the depression of the call button 70, which we have assumed to be located at the receiver end, the most appropriate location therefor. Concurrently with the energization of the relay 12S at the storage unit and also the relay 1T at the transmitter unit is the energization of the relay 1R at the receiver, these three relays all being connected in parallel by way of the lines 40, 42. Should any of the off-normal contacts 5RA14, 5RA14, 6RA14, 7RA14, 8RA14, 9RA14 be closed, thus indicating that one or more of the rotatable arms belonging to the stepping switches 4RA—4RB, 5RA—5RB, 6RA—6RB, 7RA—7RB, 8RA—8RB, 9RA—9RB is not at its home position, then of course there is a previous reading produced by the stepping switches that must be cancelled. Consequently, if such a state prevails, the reset or cancel relay 3R will be energized, for when the contacts 1R1 close, the telemeter set-up relay 2R becomes energized, closing its otherwise open contacts 2R6 to effect a circuit through the relay 3R via the off-normal contacts mentioned above. Both of the relays 2R and 3R are capable of sealing themselves in, the former through contacts 2R2, 3R1 and the latter through its contacts 3R2 in conjunction with the off-normal contacts 4RA14, 5RA14, 6RA14, 7RA14, 8RA14 and 9RA14. With relay 3R picked up, then its contacts 3R3 are likewise closed, thereby causing the various stepping switches 4RA—4RB, 5RA—5RB, 6RA—6RB, 7RA—7RB, 8RA—8RB, 9RA—9RB to step themselves around to their home position, the home position being on the 11th contact point of each level. This homing action occurs because if the arm 4RA12 should be resting on, say, its contact 4RA2, then the self-interrupting contacts 4R1 will complete the circuit to the solenoid 4R. Since all but contact 4RA11 are connected together, the circuit will continue to be completed through the contacts 3R3 until this eleventh contact 4RA11 is reached by the arm 4RA12. Then, if the switch 5RA—5RB should be off its home position, this same action will take place, this time through the additional or extended electrical circuitry involving contact 4RA11 to the rotatable arm 5RA12 and thence through any of the contacts included in the level 5RA (assuming that the arm is not on its home contact 5RA11), through the self-interrupting contacts 5R1 to the solenoid 5R. In an identically progressive fashion the remaining stepping switches 6RA—6RB, 7RA—7RB, 8RA—8RB and 9RA—9RB are returned to their home position. When all of the off-normal contacts 4RA14, 5RA14, 6RA14, 7RA14, 8RA14, 9RA14 have been opened, then, of course, the reset or cancel relay 3R drops out and the receiver unit is ready to receive a fresh supply of information.

However, when the above-outlined homing action was inaugurated to clear out any previous reading that might have been registered, closure of contacts 2R1 was instrumental in picking up the receiver maintaining relay 10R, this relay sealing itself in via its contacts 10R1 and the normally closed contacts 11R1. Usually there will be no occasion for continued depression of the call push button 70, a momentary closing being sufficient, so when the relay 3R drops out after the return of all the stepping switches in the receiver unit to their home positions, the relay 2R will follow suit, for it cannot sustain itself when the contacts 3R1 and 1R1 are open. Even so, when the relay 2R was first picked up it closed its contacts 2R4, and since the relay 10R closed its contacts 10R3, it can be appreciated that a circuit through the digit selector solenoid 12R was consumated. As has now become well established through reference to the other solenoids herein described, energization of the solenoid 12R triggers the pawl for the stepping switch 12RA—12RB—12RC, and so when the contacts 2R4 open, as they do when the relay 2R drops out, the switch arms 12RA12, 12RB12, 12RC12 are simultaneously advanced from their 12RA11, 12RB11, 12RC11 contacts to their 12RA1, 12RB1, 12RC1 contacts. With the digital selector switch 12RA—12RB—12RC on its first position, as stated in the preceding sentence, the receiver is conditioned or set up for the reception of impulses from the transmitter unit. It has already been explained how the digital selector switch 7TA—7TB—7TC of the transmitter unit is stepped through its various contact positions, each of this switch's six contact positions (excluding the seventh one which is a home position) establishing in turn an electrical path to each of the stepping switches 4SA—4SB, 5SA—5SB, 6SA—6SB, 7SA—7SB, 12SA, 13SA located in the storage unit. Accordingly, when the arm 12RB12 of the level 12RB is in its first contact position, i.e. on contact 12RB1, the pulses then received via the lines 58, 60, which pulses are representative of "units" owing to the fact that the arm 7TB12 of level 7TB of the transmitter unit is then on its first position, i.e. on contact 7TB1, it will govern the stepping of the switch 4RA—4RB.

Before amplifying upon the manner in which the above-referred to governing or controlling action is accomplished, it might be well to make certain that it is understood that transmission of pulses via the lines 58, 60 can occur whenever the contacts 5T3 and 12T1 situated serially in the conductor 58 are closed. Contacts 12T1 are normally closed, it will be remembered, whereas contacts 5T3 are normally open, the last-named contacts being closed whenever the pulsing relay 5T is energized. These pulses produced by the closing of contacts 5T3 travel over the lines 58, 60 to the relay 13R causing this relay to close its contacts 13R1 each time a pulse is received.

Under the influence of the contacts 13R1 is the pulsing relay 14R, this fast operating relay being energized for a period coterminous with the time that the contacts 13R1 are closed by its pulse actuated relay 13R. All pulses, including the hereinbefore alluded to long pulse, will operate the relay 14R. Inasmuch as the relay 14R controls the set of contacts 14R2, these contacts will successively apply charges to the condenser 72 via the contacts 15R1. However, only the long pulse will be sufficient to charge this condenser 72 to the extent necessary to pick up the long pulse detecting relay 15R. Once picked up, though, the relay 15R will seal itself in by way of contacts 15R2 and contacts 17R1. Regarding the office of the relay 15R, it is to be noted that the off-normal contacts 12RB14 associated with the digital selector switch 12RA—12RB—12RC are closed since the arm 12RB12 is on contact 12RB1, thereby completing a circuit to contacts 14R5. Up to the time that relay 15R picks up, this circuit is extended through the contacts 15R3, the arm 12RB12, the contact 12RB1 to the solenoid 4R. Due to this electrical path, the solenoid 4R will be energized once for each pulse forwarded from the transmitter unit, because the contacts 14R5, actuated by the relay 14R, will be accordingly opened and closed to pulse the solenoid 4R. However, and this is very important, when the contacts 15R3 operate, due to its relay 15R picking up upon receipt of a long transmitted pulse, this circuit is broken and the solenoid 4R can no longer be energized so as to advance the rotatable arms 4RA12, 4RB12 of the switch 4RA—4RB beyond the particular contact reached upon receipt of the long pulse. In the exemplified instance the "units" digit has been selected as "2" and so the arms 4RA12, 4RB12 come to rest on their second contacts, i.e. contacts 4RA2 and 4RB2, respectively. Since the rotatable arms 4RB12 is connected directly to the lamp bus 92 and the contact 4RB2 to the indicating lamp 6L2 in the "units" column 6L via the appropriate conductor of the ten conductor cable 90, it will be seen that the proper lamp has been conditioned for becoming lit as far as the digit "2" in the number "6,642" is concerned. As of this moment, though, the bus 92 is not energized, for the contacts 10R4 are open due to the fact that the relay 11R has not yet had an opportunity to open its contacts 11R1 to drop out the receiver maintaining relay 10R; therefore the contacts 10R4 carried by the receiver maintaining relay 10R are open. Subsequent short pulses will not result in any stepping action of the switch 4RA—4RB because of the opened contacts 15R3.

Due to the presence of the contacts 14R3, which are closed concurrently with the contacts 14R5, it can be seen that these contacts 14R3 will complete a circuit to the verification solenoid 19R each time that the pulsing relay 14R is energized and the switch 19RA—19RB will be stepped one contact point for each transmitted pulse. More will be said presently concerning the special role played by this verification stepping switch 19RA—19RB.

Meanwhile, it is to be noted that the impulse sequence detector relay 16R is also under the supervising control of the pulsing relay 14R by virtue of the contacts 14R1. Being a fast operate relay, the impulse sequence detector relay 16R will have picked up immediately upon closing of contacts 14R1 controlled by the pulsing relay 14R; being a slow release relay, this relay 16R will remain picked up as long as the contacts 14R1 continue to open and close, the normal interval of opening being insufficient to permit the relay 16R to drop out. However, at the conclusion of ten transmitted pulses the interval of opening of the contacts 14R1 is appreciably lengthened and this relay will then have time to drop out. This disparity of time stems from the fact that the non-transmit relay 12T in the transmitter unit operates at the end of ten pulses to open its contacts 12T1 so that no pulses can be transmitted over the lines 58, 60 while the arm 8TB16 is passing from contact 8TB10 to contact 8TB11 and from contact 8TB11 to contact 8TB12, all in a manner more fully dealt with earlier herein when describing the role of the distributor switch 8TA—8TB. When the relay 16R does drop out, which is about 0.15 second after the tenth opening of the contacts 14R1, the contacts 16R2 belonging to this relay will close, thereby completing a circuit to the verification solenoid 19R. This circuit may be traced from the positive bus 66 through the contacts 2R3, the now closed contacts 16R2, the rotatable arm 19RA12, contact 19RA10 (having assumed that ten transmitted pulses have caused a ten contact point advancement of the verification stepping switch 19RA—19RB), the self-interrupting contacts 19R1 on to the solenoid 19R. Energization of the solenoid 19R at this time returns the mechanically coupled arms 19RA12, 19RB12 to their home position on contacts 19RA11, 19RB11, respectively. In the preceding paragraph it has been stated that the role played by the verification stepping switch 19RA—19RB will be dealt with at greater length and it is felt that a better appreciation of the operation explained in this paragraph will be had at that time.

Inasmuch as we have now conditioned the circuit for a registration of the "units" at the receiver unit, it being remembered that the lamp 6L2 will be lighted to indicate a "2" registration when the contacts 10R4 close, it is now of concern to us how the system is conditioned for the reception of the "tens" digit. The events leading up to this happening stem from the release of the relay 16R, for when this relay dropped out it closed its contacts 16R2 and 16R4 and at the same time opened its contacts 16R1 and 16R3. Opening of the contacts 16R1 broke the circuit to the auxiliary relay 17R, but since this relay is slow release in character, it did not drop out immediately, there being a lag of approximately 0.2 second. After this 0.2 second delay, though, the contacts 17R3 carried on this relay will open, but prior to this a circuit to the stepping switch solenoid 12R existed by way of contacts 2R5, the now closed contacts 16R3 16R4, the still engaged contacts 17R3, and the closed contacts 10R3. In substance, closure of the contacts 16R4 acted to trigger the pawl associated with the stepping switch 12RA—12RB—12RC, the delayed opening of the contacts 17R3 allowing this. As soon as the contacts 17R3 open, of course, the solenoid 12R becomes de-energized and the stepping switch 12RA—12RB—12RC is spring advanced to its next contact position. In other words, the mechanically coupled switch arms 12RA12, 12RB12, 12RC12 move to their second contact position which is on contacts 12RA2, 12RB2, 12RC2. With the arm 12RB12 on contact 12RB2 it will be appreciated that an electrically conductive path is established directly from the arm 12RB12 to the arm 5RA12.

In consequence of the preceding action the transmitted pulses thereafter arriving at the relay 13R over the lines 58, 60 will open and close the contacts 13R1 to energize intermittently the pulsing relay 14R. The pulsing relay 14R in turn closes ad opens its contacts 14R5 to produce pulses that are fed to the solenoid 5R associated with the "tens" stepping switch 5RA—5RB rather than the "units" switch 4RA—4RB as heretofore. Each operation of the solenoid 5R will effect a spring advancement by one contact point the arms 5RA12, 5RB12. Here again, receipt of a long pulse, just as with the "units" transmission, will result in stoppage of the arms 5RA12, 5RB12 on the particular contact corresponding to that contact engaged by the arm 5SA12 of the "tens" switch 5SA—5SB in the storage unit. Connected to the fourth contact 5RA4 by way of one of the conductors in the cable 88 is the lamp 5L4, so thus we now have a partial total of "42" that has been transmitted out of the "6,642" sum to be sent, although the lamp 5L4 is not as yet lighted for recognition and reading.

In like fashion the "hundreds" stepping switch 6RA—6RB is advanced around to its sixth contact, thereby conditioning the lamp 4L6, and following this the "thousands" stepping switch 7RA—7RB is stepped to its sixth contact, thereby conditioning the lamp 3L6 to complete transmission and reception of the number "6,642," but still not a read-out thereof because the contacts 10R4 are still open.

Such a sequential progression will result in the digit selector switch 12RA—12RB—12RC now being in its fifth contact position, thereby readying the reecver unit for receipt of the station identifying digits. With the arm 12RB12 on contact 12RB5 a circuit is established to the solenoid 8R so that the transmission of pulses now results in energization and de-energization of this solenoid. Through repeated energization of the solenoid 8R until the contacts 15R3 are opened by the long pulse detecting relay 15R, the arms 8RA12, 8RB12 will be stepped around to contacts 8RA6 and 9RA3, the arrival of the arm 8RB12 on contact 8RB6 conditioning lamp 2L6 which signifies the digit "6" in the station number "36." After this, the digit selector switch 12RA—12RB—12RC will move one more contact to include the switch 9RA—9RB in the circuit and the arms 9RA12, 9RB12 thereof will be advanced to their third contact position, the arm 9RB12 through the contact 9RB3 then conditioning the lamp 1L3 so that the digit "3" is contained in the receiver unit.

As things now stand a total of six digits have been transmitted and received. Reviewing this operation quite briefly, it will be recalled that the digit selector switch 12RA—12RB—12RC is stepped once for each energization and de-energization of the impulse sequence detector relay 16R, all in a manner hereinbefore explained. Consequently, for each order, including the two station identification digits, the switch will be advanced one contact for each order. Thus for the six digits the arms 12RA12, 12RB12, 12RC12 will have been stepped to their sixth contact, fulfilling the typical operational sequence of storing, transmitting and receiving. In a sense, the read-out of this information is part of the system operation but will be dealt with under the separate heading set forth below.

*Receiver readout*

Having so oriented the rotatable arms of the six stepping switches 4RA—4RB, 5RA—5RB, 6RA—6RB, 7RA—7RB, 8RA—8RB, 9RA—9RB onto the various contacts corresponding to the station number "36" and the measurand "6,642," it is now desired to connect these various contacts to the appropriate indicating lamps in the six column lamp bank 1L, 2L, 3L, 4L, 5L, 6L. Such a connection has been prevented up to this time by virtue of the contacts 10R4 being open, thereby preventing power from being supplied to the lamp bank. The manner in which the contacts 10R4 are permitted to close is by the rotary arm 12RC12 being advanced to its seventh contact 12RC7, having been moved to its sixth contact 12RC6 when the digit selector switch 12RA—12RB—12RC was positioned for receipt of the sixth digit (the "3" in the station number). Upon engagement of the arm 12RC12 with contact 12RC7, the digit selector reset relay 11R is immediately energized to open its contacts 11R1, thereby de-energizing the receiver mantaining relay 10R. Since the contacts 10R4 situated in the lamp bus 92 are carried by this relay 10R, de-energization thereof will return the contacts 10R4 to their normally closed position and the specific lamps 1L3, 1L6, 3L6, 4L6, 5L4, 6L2 in the various columns are then lighted by way of the appropriate conductors respectively contained in the various cables 80, 82, 84, 86, 88 and 90, the conditioning for this happening having already been set forth with sufficient particularity, it is believed.

Also carried by the digit selector reset relay 11R are the contacts 11R2 which, upon closing, energize the solenoid 12R through the arm 12RA12, the contact 12RA7 (and those contacts circumferentially following which are all commoned together) and the self-interrupting contacts 12R1, the switch 12RA—12RB—12RC thereby stepping itself to its home position in which position the arm 12RA12 will engage contact 12RA11. Notice will be had that the contact 12RA11 of the level 12RA is isolated so that further advancement is prevented.

*Resetting the receiver*

The reading on the lamp bank, as referred to above, will remain until the next reading is called for or until the cancel button 74 is depressed. Actuation of the button 74 will of course energize the reset or cancel relay 3R which in turn will open its contacts 3R5 in the lamp bus 92 to extinguish immediately all of the indicating lamps. Additionally, contacts 3R3 will be closed so that all of the stepping switches 4RA—4RB, 5RA—5RB, 6RA—6RB, 7RA—7RB, 8RA—8RB, 9RA—9RB will return themselves to their home position, the position actually depicted in the drawing. Such action happens rapidly, the "units" stepping switch 4RA—4RB first returning its arm 4RA12 to its home contact 4RA11 through a circuit involving the self-interrupting contacts 4R1. Then, the return circuit is extended to the switch 5RA—5RB via the contact 4RA11, the same action occurring with respect to this last-mentioned switch. After this, the next switch 6RA—6RB is reset to its home position by way of the contact 5RA11 and so on until the switch 9RA—9RB is reset. During this reset period the relay 3R will be sealed in through the agency of its contacts 3R2, but when the parallel-connected off-normal contacts 4RA14, 5RA14, 6RA14, 7RA14, 8RA14 and 9RA14 have all opened, as they will do upon the six stepping switches 4RA—4RB through 9RA—9RB reaching their respective home positions in the manner outlined above, then these off-normal contacts will all be open and the relay 3R is then incapable of sustaining itself any longer so drops out.

*Incorrect readings*

There are several incorrect readings that the system is capable of guarding against:

(1) *Less than ten pulses received at the receiving unit.*—It will be recalled that ten pulses, i.e. nine short ones and one long one, should be accounted for with respect to each digit that the storage unit stores, this being six in the illustrative situation, as has already been made manifest. Accordingly, receipt of any number of pulses less than ten will be interpreted by the receiver unit as being incorrect. Assurance against registration of less than this number of pulses is provided by the verification stepping switch 19RA—19RB. In this connection, it will be perceived that the contacts 14R3 belonging to the pulsing relay 14R are in series with the operating solenoid 19R of the switch 19RA—19RB. Consequently, the switch 19RA—19RB will be notched one step for each pulse of the relay 14R.

For the purpose of guarding against an incorrect reading of less than ten pulses, the first contact 19RB1 through the ninth contact 19RB9 of level 19RB have all been strapped or connected together. Co-acting with the verification switch 19RA—19RB in this situation are the contacts 16R3 of the impulse sequence detector relay 16R, for these contacts 16R3 will close when the relay 16R drops out. However, it has already been explained that the relay 16R will not drop out until ten pulses have been transmitted, the opening of the contacts 12T1 providing a non-transmit interval of sufficient duration to effect this. Therefore, whenever the arm 19RB12 stops short of the tenth contact 19RB10, a circuit will be completed through the contacts 16R3 and 17R2, the latter being controlled by the slow release relay 17R so that these contacts 17R2 will still be closed to the relay 3R, thereby energizing this relay. Once energized in this manner the relay 3R will seal itself in through its contacts 3R2 and any of the off-normal contacts 4RA14, 5RA14, 6RA14, 7RA14, 8RA14 that might at this time be closed. At least one of the off-normal contacts will be closed because the transmission of the nine or less pulses will have advanced one of the stepping switches 4RA—4RB through 9RA—9RB from its home position. For example, if only a "units" transmission has had time to occur, then only the off-normal contacts 4RA14 of the switch 4RA—4RB will be closed. Irrespective of which order stepping switch is currently receiving transmitted data, it will be appreciated that energization of the relay 3R will result in a closing of its contacts 3R3, thereby resetting the various stepping switches 4RA—4RB, 5RA—5RB, 6RA—6RB, 7RA—7RB, 8RA—8RB and 9RA—9RB to their home positions, all in a manner corresponding to what transpired under the heading "Resetting the Receiver."

With the foregoing set of conditions in progress, it is to be noted that closure of the contacts 3R4 by the relay 3R will cause the selector reset relay 11R to pick up, the electrical circuit for so doing being from the bus 66 through off-normal contacts 12RB14, the now closed contacts 3R4 to this relay 11R. Relay 11R will seal itself in through off-normal contacts 12RB14 and its own contacts 11R3. Meanwhile, though, the contacts 11R2, which are closed when the relay 11R is energized, serve to supply power to the solenoid 12R via the arm 12RA12 to step the digital selector switch 12RA—12RB—12RC to its home position, the self-interrupting contacts 12R1 assuring this happening.

One further point that might be mentioned, although it is believed readily apparent, is that the energization of the relay 3R immediately opens the circuit of the lamp bus 92, since the contacts 3R5 contained therein will be actuated into a disengaged position. Also, inasmuch as the contacts 11R1 carried by the relay 11R are separated upon the energization of the relay 11R, they interrupt the electrical continuity to the relay 10R so that another receiving cycle must be inaugurated by again depressing the call button 70.

(2) *More than ten pulses received at the receiver unit.*—In the preceding section it was assumed that one or more pulses were lost during transmission, which might result from a number of faulty transmission conditions, particularly when radio or carrier media are used. By the same token it is possible that some spurious pulse or pulses might be added during transmission, and it is with this situation that we are now about to cope.

If more than the proper number of pulses should be received, the pulsing relay 14R will have been operated too many times, just one extra time advancing the rotatable arm 19RB12 of the verification level 19RB onto contact 19RB11. This occasions an energization of the reset or cancel relay 3R via a somewhat different electrical route than when an insufficient number of pulses is received, the present route being by way of the contacts 14R4 connecting the eleventh contact 19RB11 to the relay 3R. Having become energized, however, the same resetting action occurs that did in the previous analysis and need not be redescribed other than to say that this resetting will take place for any digital order including those orders embracing the station identification.

(3) *Long pulse not received.*—For every ten pulses received there should be included therein one long pulse; otherwise that particular stepping switch then receiving information will be advanced to its tenth contact point even though this particular contact is not the correct one. Expressed more specifically, the long pulse detecting relay 15R should have been operated once by the time the rotatable arm 19RB12 reaches the tenth contact 19RB10 on the verification level 19RB. Having once been operated, this relay 15R will be sealed through its set of contacts 15R2 by way of the contacts 17R1, as previously described. On the other hand, if ten pulses are received with no long pulse being included amongst them, the rotatable arm 19RB12 will have reached contact 19RB10 to establish a circuit through this contact 19RB10, contacts 15R4 (closed because relay 15R has failed to pick up) and contacts 17R2 to energize the reset or cancel relay 3R. Whatever reading that has been received up to this point will of course be canceled due to the picking up of the relay 3R, all in a manner identical to when this relay 3R was caused to pick up due to a number of pulses either less or greater than ten having been received.

(4) *Scanning during a certain storage transition.*—In discussing this transitional condition to be guarded against, it will be assumed that the transmitter has scanned the "units" switch level 4SA and is in the process of scanning the "tens" switch level 5SA or one of the higher order levels 6SA, 7SA. Under these circumstances we would not want the solenoid 5S to be energized.

With this aim in mind it will be remembered that the relay 11S dropped out after the units level 4SA was scanned, thereby returning its contacts 11S2 to their normally open position. Also, the contacts 9S1, controlled by the read-out relay 9S, are open because said relay 9S is energized. On the other hand, the normally open contacts 9S2 will be closed, and with the normally closed contacts 11S1 returned to their closed position upon the de-energization of the relay 11S, a circuit from the positive bus 12 to the pulse storage relay 10S can be traced through the rotary arm 4SB12, contact 4SB10, contacts 3S2, contacts 8S1 and the herein mentioned contacts 9S2, 11S1. This course of events results in the picking up of the relay 10S. A sealing path is established by this action via the contacts 10S2 which will then be closed. Since the relay 10S also controls the contacts 10S1, these contacts will now be open and accordingly prevent operation of the relay 8S.

At the end of the transmitter scanning cycle, which of course includes the switch levels 12SA and 13SA, too, the read-out relay 9S will drop out, its contacts 9S2 breaking the circuit to relay 10S to cause the relay 10S in turn to drop out. As the relay 9S drops out, though, its contacts 9S1 will close, thereby completing a circuit to the solenoid 5S. As the relay 10S drops out, it closes its contacts 10S1 to energize relay 8S, and after a short interval occasioned by the slow operate characteristics of said relay 8S the contacts 8S1 are separated to interrupt the circuit to the solenoid 5S. Then, of course, the pawl, motivated by its spring bias, advances the switch 5SA—5SB. However, this can only result after a termination of a complete scanning of the switch levels 5SA, 6SA, 7SA, 12SA, 13SA.

While the reason for postponing any transfer to the higher orders during a read-out is believed completely obvious, it might be well to select an arbitrary set of conditions. Supposing, for example, we are concerned with the number "5,999." Without the storage feature afforded by the relay 10S and its contacts the next kilowatt-hour will cause a transfer from the "units" switch 4SA—4SB to the "tens" switch 5SA—5SB to the "hundreds" switch 6SA—6SB and to the "thousandths" switch 7SA—7SB. This will, of course change our overall reading to "6,000." However, let's assume that the "hundreds" level 6SA is scanned when its arm 6SA12 is on the ninth contact 6SA9, but that the transfer takes place immediately thereafter. The "thousands" level 7SA will then be scanned when its arm is on its sixth contact 7SA6, making a reading of "6,999" instead of the correct reading of "6,000." Under the storage arrangement incorporated into the instant system, however, a reading of "5,999" would be made, the transfer of the added kilowatt-hour being delayed, but not lost. Percentagewise the single kilowatt-hour that is not read at the precise moment that the kilowatt-hour meter registers it and causes the kilowatt-hour contacts 10 to close is most insignificant.

It should be made plain that there can be a transfer to the "tens" switch 5SA—5SB even though the units switch 4SA—4SB is then being scanned. This is so because when the units transmitting relay 11S is picked up, the pulse storing relay 10S cannot pick up because the normally closed contacts 11S1 are then open. Consequently, the above units pulse breaking relay is permitted to operate in a normal fashion, for the normally closed contacts 10S1 will remain closed inasmuch as their opening depends upon the energization of the relay 10S. Thus there is no loss of stored information that can result should the kilowatt-hour contacts 10 close during a "units" scanning.

From the overall description herein given it is felt that a person familiar with telemetering equipment will be able to put the teachings of the invention into practical being. In this regard, for the sake of attempted brevity, the drawings have been kept as simple as could possibly be done under the circumstances. Accordingly, individual conductors running in the same general direction have been consolidated with take-offs at either end. As a further endeavor to simplify the drawings as much as possible, it will be noted that well known spark suppression circuitry has been entirely omitted. Still further, for the most part, only enough contacts have been depicted to carry out, although not necessarily, the task at hand; therefore the contacts included in any given stepping switch may not be the same as those usually available on the market at the present time.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. In a telemetering system: storage means for storing digital information within a preferred range of values including a group of contacts, a movable contact arm for said contacts, and means for moving said arm to a contact representative of the magnitude of stored information; transmitter means for transmitting information from said storage means including a group of contacts electrically connected with the storage group of contacts, a movable contact arm for said transmitter contacts, means for advancing said transmitter contact arm from contact to contact, means for producing an electrical pulse each time that said transmitter contact arm engages a contact, and means for modifying the pulse produced when there is a corresponding relation between contact arms; and receiver means for receiving said pulses including a group of contacts, a movable contact arm for said contacts, means for moving said arm one contact for each pulse received until receipt of said modified pulse, and means for preventing further operation of the receiver arm moving means in response to said modified pulse, whereby further movement of the receiver arm is precluded during the remainder of said range.

2. In a telemetering system: storage means for storing various orders of digital information including respective means for each order comprising a group of ten stationary members and a movable member the relative position of which with respect to a particular stationary member is representative of the magnitude of information stored for that order; transmitter means for transmitting information from said storage means including means for successively scanning each respective means to determine the relative position of the movable member for that means, means for producing a signal for each stationary member, and means for modifying the signal produced for that stationary member with which the movable member is then oriented; and receiver means for receiving said signals including a group of ten stationary members for each order, each representative of a different magnitude, a movable member associated with each receiver group, means for sequentially advancing each movable member into successive positions relative to that group of stationary members with which it is associated, said advancing means being moved in accordance with the signals received from said transmitter means, and means for stopping further advancement of each movable member in response to the modified signal for the order with which a particular movable member is associated whereby each movable member assumes a proximal position relative to a particular stationary member, the particular movable member being indicative of the order and its relative position being indicative of the magnitude of information transmitted for that order.

3. In a telemetetering system according to claim 2 in which at least one of said orders is indicative of the location of said storage means.

4. In a telemetering system: storage means for storing digital information including a movable contact arm engageable with any one of a group of fixed contacts to establish a single electrical path; transmitter means for transmitting information from said storage means including a movable contact arm engageable with any one of a group of fixed contacts corresponding in number to the first-mentioned group, circuit means for connecting the corresponding contacts of both groups together, means for moving the transmitter contact arm from one contact to another, means for producing an electrical pulse each time that said transmitter is moved to a different contact, pulse modifying means, engagement of the particular contact in the second-mentioned group corresponding to the contact of said first-mentioned group completing a circuit to activate said pulse modifying means to produce a modified pulse; receiver means for receiving said pulses including a movable contact arm engageable with any one of a group of fixed contacts corresponding in number to said first-mentioned group, means for moving said receiver arm to a different contact each time a pulse is received, and means for inactivating said last-mentioned means upon receipt of said modified pulse.

5. In a telemetering system according to claim 4 including indicating means controlled by said receiver arm; and means for preventing operation of said indicating means unless a predetermined number of pulses has been received by said receiver means.

6. In a telemetering system according to claim 5 including means for additionally preventing operation of said indicating means unless a modified pulse is included in said predetermined number of received pulses.

7. In a telemetering system: storage means for storing digital information including respective means for each order comprising a group of fixed contacts and a movable contact arm, the engagement of which arm with a particular contact is indicative of the magnitude of information stored for that order; transmitter means located near said storage means including respective means for each order comprising a group of fixed contacts, a movable contact arm and means for advancing each arm from contact to contact of the group with which it is associated, scanning means for establishing a succesive circuit connection between each contact of the various order groups to seek out the contact engaged by a storage arm, selector means for selecting each order means in turn, means for producing a pulse each time that the scanning means establishes a successive circuit connection and means for altering the pulse produced when said scanning means is in a relative position corresponding with the selected respective means to produce a modified pulse; and receiver means located at a remote point from said storage and transmitter means including respective means for each order comprising a group of fixed contacts and a movable contact arm and means for advancing each receiver arm from contact to contact upon receipt of a pulse from said transmitter unit, selector means for selecting each receiver order means in turn, means for inactivating each receiver arm advancing means upon receipt of said modified pulse, and means for initiating a scanning cycle of said transmitter means.

8. In a telemetering system: storage means for storing various orders of digital information including a group of ten contacts for each order, a movable contact arm for each group of contacts, and means for moving each arm to a contact representative of the particular magnitude of that order; transmitter means for transmitting information from said storage means including selector means for successively selecting the orders, means for scanning each group of contacts, means associated with said scanning means for producing an electrical signal for each contact of each group scanned, and means for modifying the electrical signal produced when the scanning means is in a position corresponding with a contact engaged by an arm; and receiver means for receiving said signals including a group of ten contacts for each order, a movable contact arm for each group of contacts, means for moving each arm progressively over the contacts in that group, means for succesively channeling the electrical signals received from said transmitter means to the appropriate arm moving means for the order being received and means for rendering inoperable the arm moving means for each contact group upon receipt of each modified signal thereby to preclude further movement of each arm when it has engaged a contact representative of the magnitude of the stored information for that order.

9. In a telemetering system according to claim 8 in which said modified electrical signal is a relatively long pulse and the other of said electrical signals are relatively short pulses.

10. In a telemetering system according to claim 9 in which said inoperable rendering means is responsive to only relatively long pulses.

11. A telemetering system comprising storage means for storing various orders of digital information including a switch unit for each order having ten contacts, a rotatable contact arm for each switch unit engageable with the contacts of that particular switch unit, and conductor means connecting the first, second, third, fourth, fifth, sixth, seventh, eighth, ninth and tenth contacts, respectively, of the different switch units together; transmitter means for transmitting information contained in said storage means including a selector switch having a contact for each order and a rotatable arm engageable therewith, a distributor switch provided with ten contacts and a rotatable arm engageable therewith, said distributor switch including a pair of normally closed contacts which are opened once for each advancement of the arm of said distributor switch from one contact to the next; conductor means extending from the first, second, third, fourth, fifth, sixth, seventh, eighth, ninth and tenth contacts of said distributor switch to the said first, second, third, fourth, fifth, sixth, seventh, eighth, ninth and tenth contacts of the switch units in said storage means; means for producing a transmitted pulse at the time of each advancement of said distributor switch; means for modifying the transmitted pulse each time that the distributor switch arm is in engagement with one of its contacts corresponding to the same number as the order switch unit selected for scanning by selector switch; and receiver means for receiving said pulses including the modified ones comprising a switch unit for each order having ten contacts, a rotatable contact arm for each receiver switch unit engageable with the contacts of that particular switch unit, a receiver selector switch unit for directing the pulses to the appropriate receiver switch unit, said selector switch unit having a contact for each order and a rotatable arm engageable therewith, means for advancing each receiver switch unit in accordance with the number of pulses directed thereto prior to receipt of a modified pulse, and means for inactivating each receiver switch unit upon receipt of a modified pulse and thereby preventing further operation of each receiver switch by additional pulses received for each order.

12. A telemetering system according to claim 11 including an indicating lamp for each contact on the receiver switch units; and means for postponing energization of those lamps corresponding to the transmitted digital information that has been received until transmission to the various receiver switch units has been completed.

13. A telemetering system according to claim 12 including means for resetting said receiver switch units to their starting position and preventing energization of said lamps during the period that said receiver switch units are being reset to their start position.

14. A telemetering system according to claim 13 including means for verifying whether ten pulses have been received for each order, said verifying means causing operation of said resetting means if ten pulses are not received.

15. A telemetering system according to claim 14 in which said verifying means includes means for causing operation of said resetting means if no modified pulse is received.

16. In a telemetering system: storage means for storing various orders of digital information including a stepping switch for each order, each stepping switch comprising a group of ten contacts, a rotatable contact arm and means including a solenoid for advancing each arm to a contact representative of the particular magnitude of the order assigned to that switch, and circuit means connecting corresponding contacts of each stepping switch together; transmitter means for transmitting information from said storage means including a selector stepping switch comprising a contact for each order, a rotatable contact arm and means including a solenoid for advancing said selector arm to select successively the orders, a distributor stepping switch including a group of ten contacts, a rotatable contact arm and means including a solenoid for advancing said distributor arm; means for producing an electrical pulse each time said distributor arm is advanced, and means for modifying the action of said pulse producing means for causing said pulse producing means to produce a longer pulse signifying a correspondence of said distributor stepping switch with the particular storage stepping switch then being scanned by said distributor switch; circuit means including conductor means leading from each contact of said distributor stepping switch to a corresponding contact on each of said storage stepping switches and additional circuit means extending from each of the storage arms back to said distributor arm, said additional circuit means controlling said pulse modifying means when an electrical circuit is completed as a result of the correspondence above-mentioned; and receiver means for receiving information from said transmitter means including a stepping switch for each order, each stepping switch comprising a group of ten contacts, a rotatable contact arm and means including a solenoid for advancing each arm over the group of contacts with which it is associated, a selector stepping switch comprising a contact for each order, a rotatable contact arm and means including a solenoid for advancing said selector arm to select succesively the orders and thereby channel the electrical pulses received from said transmitter means to the appropriate solenoid for the order being received, and means for preventing further channeling of pulses to each solenoid upon receipt of a longer pulse thereby to arrest further advancement of each arm when it has engaged a contact of its group representative of the magnitude of the stored information for that order.

17. In a telemetering system according to claim 16 in which said pulse producing means includes a relay and said pulse modifying means includes a relay in serial relation with said additional circuit means, a set of normally open contacts controlled by said modifying relay and a rectifier in series with said relay contacts, said relay contacts and said rectifier being in parallel with said pulse producing relay.

18. In a telemetering system: storage means for storing various orders of digital information including a stepping switch for each order, each stepping switch comprising first and second contact levels of ten contacts each, a rotatable contact arm for each level, said contact arms being coupled together for rotation in unison and means including a solenoid for advancing the coupled arms to a contact representative of the particular magnitude of the order assigned to that switch, first circuit means connecting corresponding contacts of the first contact levels together, second circuit means for connecting the zero (tenth) contact of the second contact level of the lowest order stepping switch to the solenoid of the next higher order stepping switch, and third circuit means for connecting the ninth contact of the second contact level of said next higher order stepping switch to the solenoid of the following stepping switch; transmitter means for transmitting information from said storage means including a selector stepping switch comprising first and second contact levels having a contact for each order plus a home contact, the order contacts of said first level being commoned together, a rotatable contact arm for each level, said contact arms being coupled together for rotation in unison, means including a solenoid for successively advancing the coupled arms from a home contact position to the various order contacts and a pair of self-interrupting contacts, said self-interrupting contacts being in circuit with said solenoid and the rotatable arm of said first contact level, circuit means connecting each order contact respectively to the rotatable contact arm of the first contact level of each storage stepping switch, a distributor stepping switch comprising first and second contact levels of at least ten contacts each, a rotatable contact arm for each level, said contact arms being coupled together for rotation in unison, means including a solenoid for advancing these coupled arms over their associated contact levels and a pair of self-interrupting contacts, circuit means including conductor means connecting the ten contacts of said first distributor level to the corresponding contacts of the first contact levels of said storage means and additional circuit means from each of the first level storage arms back to said first level distributor arm, a pulsing relay controlled by the self-interrupting contacts of said distributor stepping switch to produce a pulse each time said self-interrupting contacts are actuated, a long pulse initiating relay in said additional circuit means operable when said first level distributor arm is in a position corresponding with the particular first level contact arm selected by said selector stepping switch, said long pulse initiating relay having a set of normally open contacts, means controlled by said set of normally open contacts for delaying the drop out time of said pulsing relay when said long pulse initiating relay is operated thereby to produce a relatively long pulse in contradistinction to the relatively short pulses normally produced by said pulsing relay, a transmissions maintaining relay connected to the home contact of the second contact level of said selector stepping switch provided with a set of normally closed contacts in circuit with said pulsing relay to assure de-energization of said pulsing relay when said selector switch is in a home position; and receiver means for receiving pulses from said transmission means including a stepping switch for each order, each stepping switch comprising a level of ten commoned contacts plus a home contact, a rotatable contact arm, means including a solenoid for advancing said arm from the home contact to successive contacts in said level upon receipt of pulses from said transmitter means, each received pulse causing an advancement by one contact, a selector switch comprising first and second contact levels having a home contact and a contact for each order, the order contacts of said first level being commoned and the order contacts of said second level being in respective circuit relation with the corresponding solenoid of each order receiver stepping switch, a rotatable contact arm for each contact level, said contact arms being coupled together for rotation in unison and means including a solenoid for advancing the coupled arms of the receiver selector switch from their home position to successive order contacts whereby the various order receiver stepping switches have their solenoids successively connected for advancing their associated contact arms one contact for each pulse received, and means for interrupting the circuit to the solenoids of said order receiver stepping switches in response to a relatively long pulse from said transmitter means.

19. In a telemetering system according to claim 18 in which said means for delaying the drop out time of said pulsing relay includes a rectifier in series with the set of normally open contacts on said long pulse initiating relay, said set of normally open contacts and said rectifier being in parallel with said pulsing relay; and in which said long pulse responsive means includes a relay having a pair of normally closed contacts in circuit with said solenoids of the various order receiver stepping switches, said last-mentioned relay having a condenser in parallel therewith to render said relay responsive to a relatively long pulse transmitted from said transmitter means.

20. In a telemetering system: a set of primary contacts; means for closing and opening said primary contacts in accordance with a derivative of the information to be handled by the system; a first relay having first and second sets of normally open contacts, said first relay being operable by said primary contacts; a second relay in circuit with said first set of contacts provided with a first set of normally closed contacts in circuit with said first relay and a second set of normally open contacts in parallel with said first set of contacts on said first relay; and a stepping switch including a group of contacts, a rotatable arm engageable therewith and a solenoid for causing advancement of said rotatable arm, said second set of contacts on said first relay being in series with said solenoid so as to energize said solenoid by closure of said second set of contacts on said first relay as a result of operation of said primary contacts whereby operation of said second relay through the first set of contacts on said first relay will cause opening of the first set of contacts on said second relay to then de-energize said first relay, said stepping switch including a second group of contacts, a rotatable arm engageable with said second contact group, said second arm being coupled to the first arm for rotation in unison therewith; a second stepping switch including a group of contacts, a rotatable arm engageable therewith and a solenoid for causing advancement of said last-mentioned arm; a third set of normally open contacts on said second relay in circuit with the last contact of said second contact group and said second solenoid for energizing said second solenoid to cause advancement of its associated arm after predetermined contact advancement of said first arm; a transmitter unit comprising means for successively scanning the first-mentioned contact group of said first stepping switch and then the contact group of said second stepping switch; and relay means associated with said second solenoid for preventing energization thereof after completion of a scanning of said first-mentioned contact group until the contacts of said second stepping switch have been scanned.

21. In a telemetering system: storage means for storing orders of digital information including a group of contacts for each order, a movable contact arm for each group of contacts, means for moving each arm to a contact representative of the magnitude of stored information for that particular order including means for transferring information from the lowest order to the higher orders; transmitter means for transmitting information from said storage means including a group of contacts, a movable contact arm for said transmitter group of contact means for advancing said transmitter contact arm from contact to contact, selector means for electrically connecting said transmitter group of contacts first to the storage group of contacts indicative of the lowest order and then successively to those groups of contacts indicative of higher orders, means for postponing transfer of information from said lowest order group of contacts while said selector means is effecting electrical connection of said transmitter group of contacts to any of the higher order group of storage contacts, means for producing a series of electrical pulses for transmission purposes, said pulse producing means also effecting actuation of said transmitter contact arm advancing means, and means for modifying the transmitted pulse produced when there is a preferred correspondence between said transmitter contact arm and the selected storage contact arm; and receiver means for receiving said pulses including a group of contacts for each order, a movable contact arm for each receiver group of contacts, means for moving the receiver arms one contact for each pulse received until receipt of said modified pulse, means for inactivating each receiver arm moving means in response to a modified pulse, and selector means for selectively energizing the various receiver arms in accordance with the order of information being transmitted.

22. In a telemetering system: a set of contacts closable for each unit of information to be stored; first and second stepping switches, each having first and second levels of ten contacts, a rotatable arm for each level engageable with the contacts of that level, the arms of each switch being coupled together for rotation in unison, and a solenoid for advancing each arm; a first relay having first and second sets of normally open contacts, said first relay being operable by said information contacts and said second set of contacts thereon being in series with the solenoid of said first stepping switch for energizing said first solenoid; a second relay in circuit with the first set of contacts on said first relay, said second relay having a first set of normally closed contacts in circuit with said first relay and said information contacts, a second set of normally open contacts in parallel with the first set of contacts on said first relay and a third set of normally open contacts in circuit with the tenth contact of the second level of the first stepping switch and the solenoid of said second stepping switch; and conductor means electrically connecting the first contact of the two first levels together, the second contact of the two first levels together and so on for all ten contacts of each of said two first levels.

23. In a telemetering system: a set of contacts actuatable for each unit of information to be stored; a first relay having fast operate, slow release characteristics energizable by the actuation of said contacts, said first relay having first and second sets of normally open contacts; a second relay having slow operate, slow release characteristics in circuit with the first set of contacts of said first relay and energizable when said first set of contacts is closed and said information contacts are actuated, said second relay having a first set of normally closed contacts in circuit with said first relay and a second set of normally open contacts paralleling the first set of contacts of said first relay; and a stepping switch including a plurality of contacts, a rotatable arm engageable therewith and a solenoid for triggering said rotatable arm, said second set of contacts on said first relay being in series with said solenoid so as to energize said solenoid when said second set of contacts is closed as a result of the actuation of said information contacts, whereby energization of said second relay through the first set of contacts on said first relay will cause opening of the first set of contacts on said second relay to then de-energize said first relay.

24. In a telemetering system according to claim 23 including a set of contacts operable into closed position by the device the information of which is to be stored; and a relay controlled by said last-mentioned contacts for actuating said first-mentioned set of contacts.

25. In a telemetering system according to claim 24 in which said stepping switch includes a second plurality of contacts, a rotatable arm engageable therewith, said second-mentioned rotatable arm being coupled to said first-mentioned arm for rotation in unison therewith, a second stepping switch including a plurality of contacts, a rotatable arm engageable therewith and a solenoid in circuit with a selected contact of said plurality of contacts for triggering said last mentioned arm; and means for successively scanning the first-mentioned plurality of contacts on said first stepping switch and then the plurality of contacts on said second stepping switch; and relay means associated with said second solenoid for preventing circuit completion via said selected contact during a scanning of said plurality of contacts on said second stepping switch.

26. In a telemetering system according to claim 25 in which said second relay has a third set of normally open contacts in series with said selected contact and said second solenoid and said last-mentioned relay means includes a units transmitting relay which is picked up during said scanning of said first contact plurality, said units transmitting relay having a set of normally closed contacts and a set of normally open contacts, a slow release pulse storing relay in series with said normally closed set of contacts on said units transmitting relay, said pulse storing relay and said normally closed set of contacts on said units transmitting relay being in parallel with said second relay, and a slow operate above units pulse breaking relay having a set of normally closed contacts in series with said second solenoid, said third set of contacts on said second relay and said selected contact, said pulse storing relay having a set of normally closed contacts in series with said selected contact and said above units pulse breaking relay, whereby the normally open contacts on said units transmitting relay will cause energization of said pulse storing relay when closed and a pulse is derived from actuation of said information set of contacts and said second-mentioned arm is engaged with said selected contact to in effect store said derived pulse until after scanning of said plurality of contacts on said second stepping switch.

27. In a telemetering system: transmission means for transmitting digital information including means for producing a series of triggering pulses, means for modifying one of said pulses so as to make it distinguishable from the others, the number of triggering pulses preceding the modified pulse being indicative of the magnitude of digital information; and receiver means for receiving said pulses including a movable contact arm engageable with any one of a group of fixed contacts corresponding in number to the number of pulses to be included in said series, means for moving said arm to a different contact each time a triggering pulse is received, and means for inactivating said last-mentioned means and preventing further movement of said arm upon receipt of said modified pulse.

28. In a telemetering system according to claim 27 including indicating means controlled by said arm; and means for preventing operation of said indicating means unless a modified pulse is included in the series of pulses that is received.

29. In a telemetering system: transmitting means for transmitting various orders of digital information including means for producing a series of triggering pulses for each order of said information, means for modifying one pulse in each series of pulses so as to make it distinguishable from the others, the number of triggering pulses preceding the modified pulse of each series being indicative of the magnitude of that order of information, and means for preventing transmission of a given number of pulses at the end of each series so as to provide a non-transmit interval; and receiver means for receiving said pulses including a movable contact arm for each order engageable with any one of a group of contacts each arm is designed to cooperate with, each contact group having a number of contacts corresponding in number to the number of pulses constituting a series, means for moving each arm to a different contact each time a triggering pulse is received, selector switch means for directing each series of pulses to the appropriate one of said various moving means, means in circuit with said selector switch means for preventing further triggering pulses from reaching the particular moving means then selected by said selector means after receipt of a modified pulse, and relay means responsive to a series of pulses for preventing advancement of said selector switch means until completion of a series of pulses, said non-transmit interval being sufficient to then cause dropping out of said relay means.

30. In a telemetering system according to claim 29 including reset means associated with said selector switch means for returning the receiver arms to a start position after said selector means has selected the required number of orders.

31. In a telemetering system: transmitter means for transmitting various orders of digital information including means for producing a series of pulses of a predetermined number for each order, the particular pulse of a given series representative of the particular magnitude for that order having different characteristics from the others; and receiver means for receiving information from said transmitter means including respective means for each order capable of providing a physical representation of magnitude for that order, said respective means each being advanced by each pulse directed to it until receipt of a pulse having said different characteristics, means for channeling a series of pulses for a given order to the appropriate respective means indicative of that order, and means for checking whether only said predetermined number of pulses have been received for a particular order.

32. In a telemetering system according to claim 31 in which said checking means includes a stepping switch including a group of contacts equal in number to said predetermined number with all but the last one of said group joined together, a rotatable contact arm engageable with each contact and a solenoid responsive to said pulses for advancing said arm one contact for each pulse received, a reset relay, contact means in circuit with said joined contacts and said relay closable at the end of a transmission cycle for energizing said relay if said arm is in engagement with any of said joined contacts, and further contact means in circuit with said one contact and said relay operable for each pulse received to energize said relay if a pulse is received when said arm is in engagement with said one contact.

33. In a telemetering system according to claim 32 in which said predetermined number of pulses is ten so that said reset relay is energized whenever any number of pulses less than ten is received or when a number greater than ten is received.

34. In a telemetering system: transmitter means for transmitting various orders of digital information including means for producing a series of ten pulses for each order, the particular pulse of a given series representative of the particular magnitude for that order being for a longer period of time than the others; and receiver means for receiving information from said transmitter means including respective means for each order capable of providing a physical representation of magnitude for that order, said respective means each being advanced by each pulse directed to it, means precluding additional pulses for a given order from reaching said receiver means upon receipt of a long pulse, and means for channeling a series of pulses for a given order to the appropriate respective means indicative of that order.

35. In a telemetering system: transmitter means for transmitting various orders of digital information including means for producing a series of ten pulses for each order, the particular pulse of a given series representative of the particular magnitude for that order being for a longer period of time than the others; and receiver means for receiving information from said transmitter means including respective means for each order capable of providing a physical representation of magnitude for that order, said respective means each being advanced by each pulse directed to it until receipt of a long pulse, means for channeling a series of pulses for a given order to the appropriate respective means indicative of that order, and reset means for said receiver means which is operable if a number of pulses is received differing from said ten pulses.

36. In a telemetering system: storage means for storing various orders of digital information; transmitter means including means for selecting orders of stored information in a predetermined sequence, means for producing a transmitted electrical signal for all possible digits of each order, and means for modifying said signal each time that an actual stored digit is selected for each order; and receiver means for receiving said transmitted signals including means for registering the digital information received for each order in accordance with the number of transmitted signals received, means for stopping said registering means upon receipt of each of said modified signals, and means for preventing further operation of said registering means during each order after receipt of the modified signal for that particular order, said system being further characterized in that said signals are in the form of relatively short pulses and said modified signal for each order is in the form of a relatively long pulse, and that said stopping means includes a relay responsive only to said relatively long pulses and said preventing means includes a set of contacts opened by said relay to disconnect said registering means.

37. The telemetering system according to claim 36 further characterized in that it includes means for determining whether the proper number of pulses has been received and whether for said proper number of pulses there has been included therein a relatively long pulse.

38. The telemetering system according to claim 37 further characterized in that it includes means for indicating the quantity of information received and means for precluding energization of said indicating means, said indicating means being controlled by said determining means.

References Cited in the file of this patent

UNITED STATES PATENTS

| | | |
|---|---|---|
| 1,897,657 | Yates | Feb. 14, 1933 |
| 1,955,043 | Yates | Apr. 17, 1934 |
| 2,002,219 | Dimond | May 21, 1935 |
| 2,035,358 | Yates | Mar. 24, 1936 |
| 2,344,254 | Leathers et al. | Mar. 14, 1944 |
| 2,372,593 | McWhirter | Mar. 27, 1945 |
| 2,549,028 | Spencer | Apr. 17, 1951 |
| 2,680,240 | Greenfield | June 1, 1954 |
| 2,696,599 | Holbrook | Dec. 7, 1954 |
| 2,719,284 | Roberts | Sept. 27, 1955 |
| 2,749,535 | Cruess | June 5, 1956 |

FOREIGN PATENTS

| | | |
|---|---|---|
| 738,800 | Great Britain | Oct. 19, 1955 |
| 771,467 | Great Britain | Apr. 3, 1957 |

UNITED STATES PATENT OFFICE
CERTIFICATE OF CORRECTION

Patent No. 2,942,244 June 21, 1960

Walter M. Larson

It is hereby certified that error appears in the printed specification of the above numbered patent requiring correction and that the said Letters Patent should read as corrected below.

Column 1, line 54, for "relataion" read -- relation --; column 9, line 59, for "pulse", first occurrence, read -- pulses --; column 12, line 2, for "3B" read -- 3S --; column 14, line 69, for "Owings" read -- Owing --; column 15, line 33, for "scaning" read -- scanning --; column 16, line 10, for "which" read -- when --; line 13, for "suceeding" read -- succeeding --; same column 16, line 34, for "5RA14", first occurrence, read -- 4RA14 --; column 19, line 40, for "ad" read -- and --; column 24, line 73, for "telemetetering" read -- telemetering --; column 25, line 42, for "succesive" read -- successive --; column 26, line 3, and column 27, line 43, for "succesively", each occurrence, read -- successively --.

Signed and sealed this 31st day of January 1961.

(SEAL)
Attest:

KARL H. AXLINE
Attesting Officer

ROBERT C. WATSON
Commissioner of Patents